US010430870B2

(12) United States Patent
Maiona

(10) Patent No.: US 10,430,870 B2
(45) Date of Patent: Oct. 1, 2019

(54) METHOD AND SYSTEM FOR REPURPOSING LEASE ANALYSIS, ACCOUNTING, ADMINISTRATION, AND MARKET DATA COMPARISONS

(71) Applicant: LeaseCalcs, Inc., Irvine, CA (US)

(72) Inventor: Marc A. Maiona, Foothill Ranch, CA (US)

(73) Assignee: LeaseCalcs, Inc., Irvine, CA (US)

( * ) Notice: Subject to any disclaimer, the term of this patent is extended or adjusted under 35 U.S.C. 154(b) by 144 days.

(21) Appl. No.: 15/594,304

(22) Filed: May 12, 2017

(65) Prior Publication Data

US 2017/0249694 A1 Aug. 31, 2017

Related U.S. Application Data

(62) Division of application No. 14/190,724, filed on Feb. 26, 2014, now Pat. No. 9,697,572.

(60) Provisional application No. 61/770,017, filed on Feb. 27, 2013.

(51) Int. Cl.
*G06Q 30/06* (2012.01)
*G06Q 40/00* (2012.01)
*G06Q 30/02* (2012.01)

(52) U.S. Cl.
CPC ......... *G06Q 30/0645* (2013.01); *G06Q 30/02* (2013.01); *G06Q 40/12* (2013.12)

(58) Field of Classification Search
None
See application file for complete search history.

(56) References Cited

U.S. PATENT DOCUMENTS

| 9,697,572 B2 | 7/2017 | Maiona | |
|---|---|---|---|
| 2003/0101074 A1 | 5/2003 | Suzuki et al. | |
| 2003/0229592 A1* | 12/2003 | Florance | G06Q 50/16 705/51 |
| 2005/0038723 A1 | 2/2005 | Nishimaki | |
| 2005/0071265 A1 | 3/2005 | Nishimaki | |
| 2007/0100644 A1 | 5/2007 | Keillor et al. | |
| 2007/0233455 A1 | 10/2007 | Zimmer et al. | |
| 2009/0070771 A1* | 3/2009 | Yuyitung | G06Q 10/06 718/105 |
| 2009/0132316 A1* | 5/2009 | Florance | G06Q 30/06 701/532 |
| 2011/0218826 A1 | 9/2011 | Birtel et al. | |
| 2013/0073388 A1* | 3/2013 | Heath | G06Q 50/01 705/14.53 |
| 2013/0325606 A1 | 12/2013 | Balduf et al. | |

(Continued)

OTHER PUBLICATIONS

U.S. Appl. No. 14/190,724, filed Feb. 26, 2014, Marc A. Maiona.

*Primary Examiner* — Fateh M Obaid
(74) *Attorney, Agent, or Firm* — Fiala & Weaver P.L.L.C.

(57) ABSTRACT

Lease calculations may be used by commercial real estate brokers, corporate tenants, landlords, financial professionals, financial advisors, accountants and/or the like, to compare financial aspects of one or more leases and/or contracts, determine the impact of new accounting rules on current and/or future leases, comply with current and/or future lease accounting rules, generate financial reports, generate market data comparables, allow clients and users to track, manage and administer lease information and repurpose independent data points to perform one or more of these or other lease calculations or actions.

14 Claims, 30 Drawing Sheets

(56) References Cited

U.S. PATENT DOCUMENTS

2013/0332373 A1   12/2013  Marshall
2014/0164260 A1*  6/2014  Spieckerman ......... G06Q 50/16
                                                  705/306
2017/0249705 A1    8/2017  Maiona

* cited by examiner

Table 1A — LEASE ANALYSIS

| Category | Field | | |
|---|---|---|---|
| Basic Info | Tenant Name | Building Name | Zip / Postal Code |
| | Fiscal Year End | Building Street Address | Country |
| | Discount Rate | City | Building Class |
| | Landlord Name | State | Lease Commencement Date |
| Premises | Name / Suite | Beginning Date | Adjusted Square Footage |
| | Square Footage | Ending Date | Adjusted Sq. Ft. Ending Date |
| | Applicable Premises (checklist) | Method of Increase - Schedule | - End Date |
| | Method of Input: | - Begin Date | - Rent value |
| Base Rent | - $ / Sq. Ft. / Year | - End Date | Method of Increase - Percentage |
| | - $ / Sq. Ft. / Month | - Rent value | - Rent Commencement Date |
| | - $ / Year | Renewal Rents | - Initial Rent Value |
| | - $ / Month | - Begin Date | - Annual % Increase |
| | Applicable Premises (checklist) | Operating Expenses | Taxes |
| | Additional Rent Structure - List | First Day of Base Year (if applicable) | First Day of Base Year (if applicable) |
| | - True FSG | Date Tenant Begins to Pay | Date Tenant Begins to Pay |
| | - Gross - Base Year | Building's Expenses at Commencement | Building's Expenses at Commencement |
| Additional Rent | - Gross - Expense Stop | Base Year / Expense Stop Value (if applicable) | Base Year / Expense Stop Value |
| | - Gross - Base Year + Electric | Date of First Annual Increase | Date of First Annual Increase |
| | - NNN | Annual Increase % | Annual Increase % |
| | - Hybrid | Does Base Year Reset (Y/N) | Does Base Year Reset (Y/N) |
| | - Not Applicable (No Add'l Rent) | Date of Reset | Date of Reset |
| Misc. Rent | Description | Start Date | End Date |
| | Disguised Minimum Rent (Y/N) | Date % Rent Begins | Breakpoint Constant During Term (Y/N) |
| | Annual Sales Information | Breakpoint Information | - Start Date |
| Percentage Rent | - Annual Sales at Commencement | - Natural or Stipulated | - End Date |
| | - Annual % Increase in Sales | - Breakpoint Constant? (Y/N) | - Breakpoint % or Value |
| | - Date of First Annual Increase | - % Rate or Value Used for Breakpoint | Percentage Rent Abatement (Y/N) |
| | Reserved Parking | Is Tenant Required to Pay for Parking | Ending Date |
| Parking | - Ratio per 1,000 Sq. Ft. | Ratio by Premises | Number of Spaces |
| | - Specified Number | Specified Number | Parking Charge - Specified or Market |
| | - No Reserved Parking | Beginning Date | Per Space or Monthly Value |
| | Tenant Improvements | - Date TI Work Completed | - Date Improvements Completed |
| | - Turnkey Deal (Y/N) | - Unused Allowance Credit to Rent | Mid-Term Allowance(s) |
| Tenant Improvements & Initial Costs | - Value of Turnkey Work / Sq. Ft. | Other Improvements Funded by Tenant | - Does Tenant Receive Mid-Term (Y/N) |
| | - TI Allowance From Landlord | - Description | - Date Mid-Term Received |
| | - TI Cost | - Amount / Sq. Ft. | - Mid-Term Allowance Value / Sq. Ft. |
| | - Useful Life of TI Work | - Useful Life of Improvements | - Cost of Mid-Term Improvements |

FIG. 6A

| Table 1B | |
|---|---|
| Lease Expiration Date | Termination Option in Lease (Y/N) |
| Renewal Options in Lease (Y/N) | Early Termination Date |
| Months of Renewal Term | Termination Fee |
| Include Renewal in Analysis (Y/N) | Include Termination in Analysis (Y/N) |
| Additional Premises Name / Suite | Add'l Premises Beginning Date |
| Additional Premises Square Footage | Add'l Premises Ending Date |
| - Date of first increase | - Date fixed increase occurs |
| -- Increase in Lieu of % Increase? (Y/N) | - % Increase after fixed increase |
| Renewal Rents - Initial Value | - Is fixed increase entirely in lieu of % |
| Renewal Rents - % Increase | - Fixed increase + % increase |
| Increase in Lieu of % Increase? (Yes) | - % increase plus fixed increase |
| - Fixed Increase Value | Additional Increases in lieu of %? (Y/N) |
| Insurance | Electric |
| First Day of Base Year (if applicable) | First Day of Base Year (if applicable) |
| Date Tenant Begins to Pay | Date Tenant Begins to Pay |
| Building's Expenses at Commencement | Building's Expenses at Commencement |
| Base Year / Expense Stop Value (if applicab | Base Year / Expense Stop Value (if applicab |
| Date of First Annual Increase | Date of First Annual Increase |
| Annual Increase % | Annual Increase % |
| Does Base Year Reset (Y/N) | Does Base Year Reset (Y/N) |
| Date of Reset | Date of Reset |
| Monthly Value | Additional Misc. Rents |
| Frequency of Payment | Does % Rent Rate Vary by Sales Volume |
| Does % Rent Rate Change During Term | Sales Start Point |
| Beginning Date | Sales End Value |
| Ending Date | Infinite Value / No limit |
| % Rate | % Rent Rate Applicable |
| Beginning Date | Date Tenant Begins to Pay |
| Ending Date | Annual Increase % |
| Value | Date of First Annual Increase |
| Market Rate at Commencement Date | Unreserved Parking (Repeat Fields) |
| -- Useful Life of Improvements | Commissions Paid by Tenant |
| - Date Improvements Completed | Other Initial Direct Costs to Tenant |
| Other Up Front Incentives | Moving Costs |
| -- Moving Allowance Value | Landlord's Initial Costs |
| - Other Incentives Value | - Commissions Paid by Landlord |
| Tenant's Legal, Architect, etc., Fees | - Legal, Architect, etc., Costs |

FIG. 6B

Table 2A — LEASE ACCOUNTING

| | | | |
|---|---|---|---|
| Borrowing Rate | Incremental Borrowing Rate | Benchmark Corporate Borrowing Rate | Similar Term Borrowings in Quarter (Y/N) |
| | Similar Term Borrowings in Past Year (Y/N) | Rate of Recent Borrowings | Benchmark Treasury / Index Rate |
| FAS13 / IAS 17 Capital Lease Test & Type A vs. B Lease Test | Is Lease For Portion of Building (Y/N) | - Land Value Portion of Building Value | Quality of Construction (A, B, C) |
| | - What is Fair Market Value of Bldg | Current Age of Property | Type of Construction (Steel, Concrete, etc) |
| | - Source of Valuation | Remaining Useful Life of Building | Date of Last Major Renovation |
| | - Upload Valuation Documents | Remaining Economic Life of Building | Upload Useful Life Documents / Appraisal |
| Renewal & Termination Options | Does option contain a discount (Y/N) | Renewal Option at Preset Rate in Lease? | Does Termination Yield New Lease (Y/N) |
| | If Yes, How is Discount Expressed | Preset Renewal Rate | Restoration Obligations in Lease |
| | - % of FMV | Projection of FMV Rate @ Renewal Date | Estimate Cost of Restoration at Expiration |
| | - $ / Sq. Ft. / Year (Month) Less than FMV | Source of Estimate | Maximum Useful Life of TIs |
| | - Not Less Than / Greater Than $X? | Penalty for Non-Renewal / Termination | Strategic Value of Leased Facility |
| Disguised Rent | Framework To Establish "DMR" | - % of Total Rent Contingent Rent | - Base Minumum Sales / Output @ Site |
| GL & Cost Ctr. | GL Code | Business Unit / Division | Cost Center |
| User Rules | User Accounting Rules | User Accounting Policies | Other User Accounting Data |

FIG. 7A

| Table 2B | |
|---|---|
| Rate of Recent Borrowings | Secured or Unsecured |
| Spread Above Index Rate | Fiscal Year End |
| Does Lease Transfer Ownership to Tenant | Date Option Exerciseable |
| Tenant Has Bargain Purchase Option (Y/N) | Criteria for "Insignificant Portion" of FMV |
| Purchase Option Amount | - Threshhold as Percentage of FMV |
| Fair Market Value of Building | - Threshhold as Total Difference to FMV |
| - Proximity to Key Client a Factor | - High Profit Location |
| - Proximity to Key Supplier a Factor | Specialized Improvements in Facility (Y/N) |
| - Proximity to Other Company Facility | Gov't Requirements re: Relocation |
| - # Alternate Sites in Strategic Radius | Specialized Features of Location (Y/N) |
| - High Image / Flagship Location | If Yes, Alternate Sites w/ Similar Features |
| - Guaranteed Minimum Rent in Lease? | - Value of Minimum Rent in Lease |
| Allocation Percentage | Allocation Methodology |

FIG. 7B

| Table 3A | | LEASE ADMINISTRATION | |
|---|---|---|---|
| Notice and Payment Info | Landlord Notice Address 1 | Landlord Phone | Landlord Contact Email |
| | Landlord Notice Address 2 | Landlord Contact Name | Property Manager Address |
| Critical Dates | Date Reminder 1 - Months to Reminder | Renewal Options | Termination Options |
| | Date Reminder 2 - Months to Reminder | - Earliest Exercise Date | - Earliest Exercise Date |
| | Tenant Improvement Use Deadline | - Latest Exercise Date | - Latest Exercise Date |
| Other Options | Right of First Offer - Lease | - Continuing or One Time | - Space |
| | - Space | Right of First Offer - Purchase | - Continuing or One Time |
| | - Continuing or One Time | - Space | Expansion Option |
| | Right of First Refusal - Lease | - Continuing or One Time | - Space |
| | - Space | Right of First Refusal - Purchase | - Effective Date |
| Other Provisions | Rent Due Date | - Chilled Water | Sublease Rights |
| | Grace Period | - HVAC | - Profit Sharing |
| | Late Fee | - Standard Building Hours | - Recapture |
| | Landlord Provided Services | - After-Hours Charge | SNDA |
| | - Janitorial | Supplemental HVAC | Default |
| | - Elevator | Tenant Insurance Requirements | - Financial Cure Period |
| | - Security | Landlord Insurance Requirements | - Non-Financial Period |
| | - Water | Assignment | Holdover |

FIG. 8A

| Table 3B | |
|---|---|
| Property Manager Phone | Property Manager Email |
| Property Manager Contact Name | Payment Address |
| Expansion Options | Contraction Options |
| - Earliest Exercise Date | - Earliest Exercise Date |
| - Latest Exercise Date | - Latest Exercise Date |
| - Continuing or One Time | Purchase Option |
| Contraction Option | - Date |
| - Space | Other Option |
| - Effective Date | - Description |
| - Continuing or One Time | - Date to Exercise |
| - Rate | Additional Rent Charges |
| - Month-to-Month / Sufferance | - Prorata Share |
| Estoppel Certificate Deadline | - Gross Up % |
| Alterations | - Cap on Controllable Costs |
| Casualty | - Audit Rights |
| Condemnation | - Audit Window |
| Signage | - Completion |
| Guarantor | Relocation Right |

FIG. 8B

| Table 4 | OUTPUT FOR LEASE ANALYSIS | |
|---|---|---|
| Summary Info. on Location & Lease | Annual Cash Flows by Component | Net Present Value of All Rent & Costs |
| Abstract of Lease Data | Monthly Cash Flows by Component | NPV of All Rent & Costs / Sq. Ft. / Year |
| | Total Annual Cash Flows | Landlord's Net Effective Rents |
| | Total Annual Cash Flows / Sq. Ft. / Year | Landlord's Net Effective Rent / Sq. Ft. / Yr. |

FIG. 9

| Table 5 | OUTPUT FOR LEASE ACCOUNTING | |
|---|---|---|
| Deferred Rent Credit Balances | FAS13 / IAS17 Straight Line Rent | Total P&L Impact / Period |
| Tenant Improvement Asset Balances | Type B Lease Straight Line Rent | Total P&L Impact / RSF / Year |
| Initial Direct Cost Asset Balances | Tenant Improvement Amortization | Total EBITDA Impact / Year |
| Right of Use Asset at Transition Date | Initial Direct Cost Amortization | Monthly Journal Entries for GL / ERP |
| Right of Use Asset at Lease Commence | Right of Use Asset Amortization | Comparative Period Financial Reporting |
| Right of Use Asset Balances Thru Term | Interest Expense | Adjustments to Asset @ Amendment |
| Lease Liability at Transition Date | SG&A Expenses | Adjustments to Liability @ Amendment |
| Lease Liability at Lease Commence | | Amendment Impact on Straight Line Rent |
| Lease Laiability Balances Thru Term | | Net Income Impact @ Early Termination |

FIG. 10

| Table 6 | OUTPUT FOR LEASE ADMINISTRATION | |
|---|---|---|
| All Lease Analysis & Accounting Output | Critical Date Reports | Custom Reporting |
| Full Lease Abstract | Automated Notifications | |

METHOD AND SYSTEM FOR REPURPOSING LEASE ANALYSIS, ACCOUNTING, ADMINISTRATION, AND MARKET DATA COMPARISONS

CROSS-REFERENCE TO RELATED APPLICATION(S)

This application is a divisional application of U.S. patent application Ser. No. 14/190,724, filed on Feb. 26, 2014, and entitled "Method and System for Repurposing Lease Analysis, Accounting, Administration, and Market Data Comparisons," which claims priority to U.S. Provisional Patent Application No. 61/770,017, filed Feb. 27, 2013, and entitled "Method and System for Lease Analysis, Accounting, Administration, and Market Data Comparisons," the entirety of each of which is incorporated by reference herein.

BACKGROUND

Technical Field

The present invention relates to aggregation and utilization of repurposed data related to contracts, and in particular, to performing calculations related to lease transactions and the associated lease analysis, lease accounting, lease administration, and market data comparisons.

Background Art

Historically, lease accounting was a relatively simple process. However, new lease accounting standards are far from simple, and transitioning to new standards is costly and time consuming. A recent 2012 study commissioned by the U.S. Chamber of Commerce, the Building Owners & Managers Association International and several commercial real estate industry groups (available at http://www.centerforcapitalmarkets.com/wp-content/uploads/2010/04/2012-02-08-IASB-FASB-CA-Report-FINAL-v-3_2_.pdf), reported the cost for companies to implement new lease accounting standards from Financial Accounting Standards Board ("FASB") and the International Accounting Standards Board ("IASB") could run into the millions of dollars, and some companies projected their implementation costs would reach $50 million. Another recent 2011 survey commissioned by Deloitte (available at http://www.deloitte.com/assets/Dcom-UnitedStates/Local%20Assets/Documents/us_fas_lasr_021411.PDF revealed 93% of commercial real estate tenants did not believe they were very well prepared to make the transition, 65% were not confident in the integrity of their existing lease data and 80% did not believe their technical support (IT) providers and/or departments could help them effectively and efficiently comply. In other words, companies expect a need for significant help in making transitions to new rule sets because companies lack the necessary tools, technology, knowledge, and in-house labor availability for compliance.

There also exists a need for techniques that allow for automatic incorporation and repurposing of market data from third-parties (e.g., other companies, brokers, and advisors). Existing solutions for acquiring market data involve manual entry of database information which is inefficient and prone to error. Further, existing solutions do not allow for repurposing of the vast amount of third-party market data that could be available through the implementation of an efficient, repurposing system.

BRIEF SUMMARY

Methods, systems, and apparatuses are described for performing calculations related to lease analysis, accounting, administration, and market data comparisons using repurposed lease data and information, substantially as shown in and/or described herein in connection with at least one of the figures, as set forth more completely in the claims.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIGS. 6A and 6B show Tables 1A and 1B listing a non-exhaustive set of lease analysis inputs, according to an exemplary embodiment.

FIGS. 7A and 7B show Tables 2A and 2B listing a non-exhaustive set of lease accounting inputs, according to an exemplary embodiment.

FIGS. 8A and 8B show Tables 3A and 3B listing a non-exhaustive set of lease administration inputs, according to an exemplary embodiment.

FIG. 9 shows Table 4 listing a non-exhaustive set of lease analysis outputs, according to an exemplary embodiment.

FIG. 10 shows Table 5 listing a non-exhaustive set of lease accounting outputs, according to an exemplary embodiment.

FIG. 11 shows Table 6 listing a non-exhaustive set of lease administration outputs, according to an exemplary embodiment.

FIGS. 12-19 are portions of a user interface for receiving inputs related to a lease analysis calculation, according to an exemplary embodiment.

Embodiments will now be described with reference to the accompanying drawings. In the drawings, like reference numbers indicate identical or functionally similar elements.

Figure 1A:
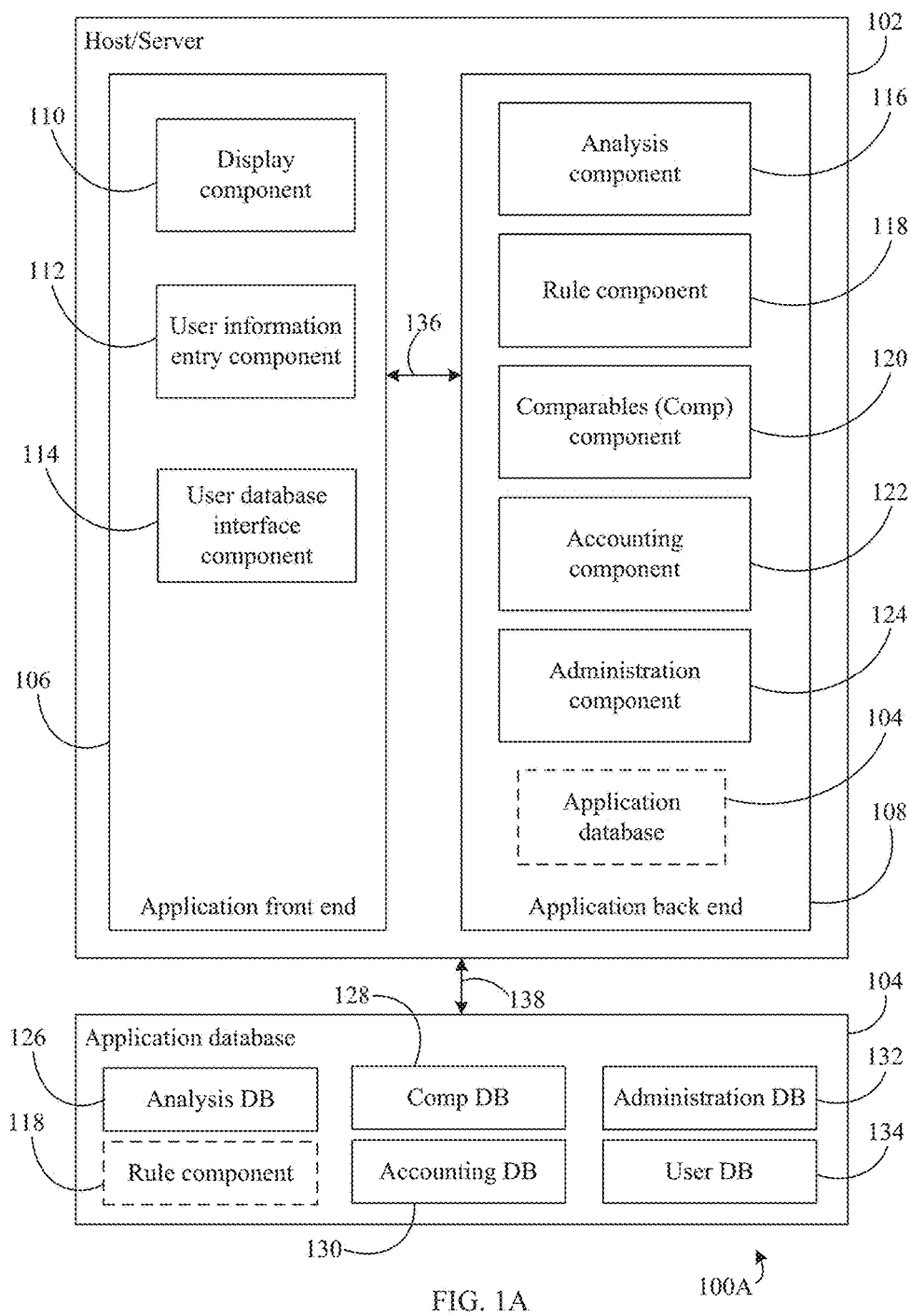
FIG. 1A is a block diagram of a portion of a host/server, according to another exemplary embodiment.

Additionally, the left-most digit(s) of a reference number identifies the drawing in which the reference number first appears.

DETAILED DESCRIPTION

Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Still further, terminology used herein such as "about," "approximately," and "substantially" have equivalent meanings and may be used interchangeably.

The term "platform" as referenced herein includes, but is not limited to, the following that may perform aspects of the various embodiments described herein: a computer program or application, a software suite, a website, a webhost, a computing system, a network system, a server or computing device, a handheld device, a mobile or smart phone, and/or the like, as well as any combination thereof.

The term "database" as used herein may be abbreviated as "DB" and both terms may be used interchangeably.

The term "lease" as used herein may refer to a proposed lease and/or to an executed lease, both of which may include lease amendments, unless specifically noted to the contrary.

Numerous exemplary embodiments are described as follows. It is noted that any section/subsection headings provided herein are not intended to be limiting. Embodiments are described throughout this document, and any type of embodiment may be included under any section/subsection. Furthermore, disclosed embodiments may be combined with each other in any manner.

Example Lease Calculation Embodiments

The embodiments described herein may be adapted to various types of lease calculations associated with the management of one or more leases. "Lease management" includes, without limitation, lease analysis, lease accounting, lease administration, and comparisons of different leases, whether proposed or executed, of different, comparable real estate properties. In embodiments, the term "lease calculation" may encompass different aspects of: lease analysis (financial or otherwise), accounting rule compliance, accounting rule impact, decision making related to leases, lease administration, lease market data comparables ("comps") calculations, reporting, data management, and/or the like. Lease calculations may be used by commercial real estate brokers, commercial real estate tenants, landlords, financial professionals, financial advisors, and/or the like, to perform one or more analyses or calculations, including but not limited to, comparing financial aspects of one or more leases and/or contracts, determining the impact of new accounting rules on current and/or future leases, complying with current and/or future lease accounting rules and standards, generating financial reports, and leveraging/utilizing (i.e., repurposing) independent data points to perform one or more of these (or other) actions. That is, in embodiments, data from one lease aspect may be repurposed and utilized by a different lease aspect. Lease calculation factors such as, but not limited to, past/current/future lease details, lease amendments, lease accounting rules or standards (e.g., Generally Accepted Accounting Principles (GAAP), International Financial Reporting Standards (IFRS), FASB, and/or IASB), comparable leases of properties, financial information, and/or the like may be used in the lease calculations and analyses.

Lease calculations and resulting reports based on analyses may be associated with one or more leases in a user's portfolio, or with one or more leases across multiple users' portfolios. Reports may be filtered according to user preferences and lease-specific inquiries. For instance, a comps report for a given user may show market data comps associated with that user and/or market data comps associated with other users' data stored in the database of the system. Reports may be filtered according to property location, type, rent amount, relevant dates, and/or any other metric as would be understood by one of skill in the relevant art(s) having the benefit of this disclosure. User-specific filtering may be performed using one or more user inputs to a user interface, such as those described herein.

In embodiments, data related to one or more users and/or one or more leases may be used to perform a lease analysis, lease accounting, lease administration, and/or comparisons of leases for real estate properties. For instance, a user may enter data related to a potential lease such as start date, end date, building name, address, lease space square footage, rent, etc., and a lease analysis may be performed. The result(s) of the lease analysis may be presented to a user in various formats as a lease analysis report including tables, graphs, spreadsheets, maps, and/or the like. According to embodiments, lease analysis outputs provided in the lease analysis report may then be used to perform functions related to lease accounting, lease administration, and/or comparisons of leases real estate properties. That is, the lease analysis output data may be repurposed as lease accounting input data, lease administration input data, and/or real estate property lease comparison input data (a comparables input).

For example, lease analysis outputs may be used to generate lease accounting analyses and reports related to a lease. The lease analysis outputs may be combined and/or modified with input data for a lease accounting analysis and then used to perform lease accounting calculations and analyses with other lease accounting input data. In some embodiments, lease analysis outputs may be used as inputs to lease accounting calculations. For instance, a discounted cash flow analysis generated as part of lease analysis report, via lease analysis calculations, may be used as an input for a lease accounting analysis, for use in lease accounting calculations, to determine and a profits and losses impact pursuant to the subject lease accounting standard(s). As described in these examples, without limitation, the lease analysis outputs are thus repurposed and used to perform lease accounting calculations. Similarly, data and information associated with lease accounting, data and information associated with lease administration, and data and information associated with comps may each be used by (i.e., repurposed for) any other lease calculations.

Another example of information and data repurposing using the inventive techniques described herein includes utilizing third-party data. For example, real estate and lease information from a broker database may be leveraged by a user, or shared and/or stored in a user's database. The broker information may be repurposed during lease calculations of the user, as described herein. Similarly, database information associated with other users of the described systems may be leveraged by a user, or shared and/or stored in the user's database, for repurposing and performing lease calculations. This sharing and/or storing of third-party and other users' data and information may be performed by the described systems with or without user intervention thus providing an efficient, highly accurate sourcing of data and information for repurposing by the user.

The techniques and embodiments described herein provide for improvements in lease management and lease calculations by repurposing data and information from different aspects of lease management to be used with previously unassociated lease aspects, as described above.

For instance, methods, systems, and apparatuses are provided for performing lease calculations using repurposed lease data and information. In an example aspect, a system is disclosed that includes a lease analysis component and a lease accounting component. The lease analysis component is configured to receive at least one lease analysis input data element. The lease analysis component is also configured to generate at least one lease analysis output element based on the at least one lease analysis input data element, and provide a lease analysis report including the at least one lease analysis output element to a user via a first user interface. The lease accounting component is configured to receive the at least one lease analysis output element and to receive one or more lease accounting input data elements. The lease accounting component is also configured to repurpose the at least one lease analysis output element using at least one of the one or more lease accounting input data elements to generate at least one additional lease accounting input element. The lease accounting component is further configured to generate at least one lease accounting output element automatically, based on the one or more lease accounting input elements and the at least one additional lease accounting input element, and to provide a lease accounting report that includes the at least one lease accounting output element to at least the user via a second user interface.

In another example aspect, a system is disclosed that includes a lease administration component. The lease administration component is configured to receive at least one of at least one lease analysis output element generated by a lease analysis component, at least one lease accounting output element generated by a lease accounting component, or at least one real estate property lease comparables output element generated by a comparables component and/or stored in a database of the system. The lease administration component is also configured to receive one or more lease administration input data elements and to repurpose the at least one lease analysis output element, the at least one lease accounting output element, and/or the at least one real estate property lease comparables output element using at least one of the one or more lease administration input data elements to generate at least one additional lease administration input element. The lease administration component is further configured to generate at least one lease administration output element automatically, based on the one or more lease administration input elements and the at least one additional lease accounting input element, and to provide a lease administration report that includes the at least one lease administration output element to a user via a user interface.

In yet another example aspect, a system is disclosed that includes a comparables database and a lease comparables component. The comparables database is configured to store information related to one or more leases of real estate properties. The comparables component is configured to receive one or more of at least one lease accounting output element, at least one lease administration output element, and at least one lease analysis output element. The lease comparables component is also configured to receive information related to at least one of the one or more leases of real estate properties stored in the comparables database, and to repurpose the one or more of at least one lease accounting output element, at least one lease administration output element, and at least one lease analysis output element to automatically generate at least one comparables input data element. The lease comparables component is further configured to generate a comparables analysis based on the at least one comparables input data element and the information, and to provide a comparables report based on at least a portion of the comparables analysis to a user via a user interface.

It is contemplated that embodiments described herein with respect to lease calculations are not so limited, and that other types of contracts may be utilized in such embodiments, as would be understood by a person of skill in the relevant art(s) having the benefit of this disclosure.

Various example embodiments are described in the following subsections. In particular, example embodiments for host/server and network implementations are described, followed by example operational embodiments. This is followed by a description of exemplary lease calculations, data, and information. Example interface embodiments are subsequently described. Next, further example embodiments and advantages are described. Finally, some concluding remarks are provided.

Example Host/Server and Network Embodiments

The example embodiments described herein are provided for illustrative purposes, and are not limiting. The examples described herein may be adapted to various types of wired and wireless systems, computing systems, communication devices, and/or the like. Furthermore, additional structural and operational embodiments, including modifications and/or alterations, will become apparent to persons skilled in the relevant art(s) from the teachings herein.

In embodiments, a host/server may supply or provide access to lease calculation services and/or applications to one or more of the clients/users. The host/server may, for example, host a webpage or application that a client/user (i.e., a subscriber) may access via a user account or subscription. The client/user may also create an account that includes client-/user-specific information via a webpage or other application provided by, e.g., the host/server. The host/server may also allow the client/user to download data and/or applications, such as those described in embodiments herein, for local use and/or storage. That is, some portion of the lease management techniques described, while for ease of description are in the context of being performed by a host/server, may be performed at a client device, in some embodiments.

The host/server may be configured in various ways, in embodiments. For example, FIG. 1A shows a block diagram of a portion of a host/server configuration 100A, according to an embodiment. As shown in FIG. 1A, a host/server 102 includes an application front end 106 communicatively coupled to an application back end 108 via a connection 136. Host/server 102 is configured to be communicatively connected to an application database 104 via a connection 138.

Application front end 106 shown in FIG. 1A includes a display component 110, a user information entry component 112, and a user database interface component 114.

In embodiments, display component 110 may present information related to lease calculation applications and/or services to a client/user. For example, an application or webpage may be displayed to a user using display component 110. Various user interfaces, as described herein, may also be displayed using display component 110 in order to allow a user to enter data and information as well as to provide reports and analyses to the user.

User information entry component 112 is configured to receive and process user information entered with regard to lease calculation services and/or applications provided by host/server 102. Such information may relate to the account of the user, leases or contracts of the user, and/or the like. User information entry component 112 is configured to perform its functions by implementing one or more user interfaces (such as those described in a subsequent section) for display by display component 110.

User database interface component 114 is configured to receive information/data from, or provide information/data to, a database that is local to or associated with a client/user. For example, if a client/user is provided an application from host/server 102, the user database interface component is configured to facilitate data exchange related to the provided application. User database interface component 114 is configured to provide a communication link between a client/user database and application database 104, and also between a third-party database and application database 104. In embodiments, user database interface component 114 may be configured to provide information stored in the database of a first user to a second user (i.e., an affiliated or un-affiliated user) in order to enable performance of various lease calculations for the second user using the data of the first user. The first and second users may be subscribers, brokers, advisors, and/or the like. User database interface component 114 is also configured to provide a communication link between application database 104 and a client/user.

While not shown for illustrative clarity, each component of application front end 106 may be operatively and/or communicatively coupled to each other component of application front end 106 via one or more connections such as wired connections and/or wireless connections.

Application back end 108, as shown in FIG. 1A, includes a lease analysis component 116 (or analysis component), a rule component 118, a market data "comparables" (also, "comp" or "comps" herein) component 120, a lease accounting component 122 (or accounting component), and a lease administration component 124 (or administration component). In some embodiments, application database 104 may also reside in application back end 108. The components of application back end 108 may perform their functions in accordance with the analyses and calculations discussed in further detail below in the Example Operational Embodiments and Example Lease Calculation Embodiments sections. Furthermore, components of application back end 108 may include hardware and/or algorithms for performing various analyses related to lease calculations.

In embodiments, lease analysis component 116 may generate reports or other outputs associated with any performed lease analysis and/or calculations which are to be provided to a client/user. Lease analysis calculations and analyses include calculations and analyses in a lease management flow up to, and including, cash flow analyses and net present value calculations.

Rule component 118 may include past, present, and/or future standards and rules associated with lease calculations, such as GAAP, IFRS, FASB, and/or IASB, as well as changes and/or amendments made thereto. Rule component 118 may include client-/user-specific rules and preferences related to how a particular client/user manages their lease portfolio and proposed leases. These rules and preferences (or policies) may include test constraints that may be used to validate assumptions involved in creating and analyzing leases and lease proposals. In embodiments, lease analysis component 116 uses the standards, rules, and policies included in rule component 118 for performing various analyses and/or uses its own rules and algorithms to perform the analyses. In some embodiments, rule component 118 may be a sub-database of application database 104.

Comp component 120 includes functionality to obtain and classify data associated with one or more leases (e.g., of one or more client/users) geographically by type and/or class of lease or property, including financial data related to those leases. In embodiments, comp component 120 may also obtain data from the secondary information source(s) shown in FIG. 2 and described below. The lease calculations performed by comp component 120, and/or the results obtained therefrom, may be stored in comp component 120 and/or in application database 104.

Lease accounting component 122 includes functionality to perform lease accounting related to one or more leases or lease proposals, for example, in accordance with current and/or future accounting rules and standards (although other rules/standards are contemplated herein). Lease accounting component 122 may utilize one or more filters, tests, and/or policies to efficiently and correctly perform lease accounting calculations. Furthermore, modifications and/or amendments to a lease(s) may be compared and/or analyzed by lease accounting component 122.

Lease administration component 124 includes functionality to manage existing and newly executed leases. For example, information about a lease or set of leases which may have been originally entered into application database 104 for purposes of creating a lease analysis, and/or generating lease accounting and/or market data comps, may be utilized to allow a client/user to manage and track key events and information about the leases in the client's/user's account and portfolio. Furthermore, modifications and/or amendments to a current lease(s) may be developed, compared and/or made, and proposals related to existing leases may likewise be developed, compared and/or made.

Additionally, data associated with lease modifications and/or amendments may be altered or changed via lease administration component 124, lease analysis component 116 and/or lease accounting component 122, and these alterations or changes may be included in comp component 120 and/or application database 104.

While not shown for illustrative clarity, each component of application back end 108 may be operatively and/or communicatively coupled to each other component of application back end 108 via one or more connections such as wired connections and/or wireless connections.

Application database 104 may, in embodiments, store any information related to: clients/users, leases associated with, or independent of, the clients/users, analysis and/or results, reports, administration, accounting, comps, other data described herein, and/or data related to lease calculations as would become apparent to a person skilled in the relevant art(s) having the benefit of this disclosure. Application database 104 may be organized, conceptually or in practice, to include a number of sub-databases such as, but not limited to: an analysis database 126 configured to store lease analysis data and information, a rule component 118 configured to store rules, policies, and lease accounting standard information, a comp database 128 configured to store comp data and information, an accounting database 130 configured to store lease accounting data and information, an administration database 132 configured to store lease administration data and information, and/or a user database 134, as shown in FIG. 1A.

In some embodiments, each client/user may have a sub-database of any and/or each of those described immediately above, while in other embodiments, application database 104 may include client-/user-specific information in a subset of each sub-database. That is, example User "A" may be assigned a portion of application database 104 in which an instance of analysis database 126, rule component 118, comp database 128, accounting database 130, administration database 132 and/or a user database 134 are implemented. Alternatively, application database 104 may distributively store information associated with example User "A" in each of the sub-databases described as shown in FIG. 1A.

In embodiments, some or all lease-related data stored in application database 104 may be utilized, shared, and/or stored across multiple user accounts for performing one or more lease calculations as described herein.

In embodiments, client/user accounts may contain the following information and/or organization in application database 104.

Subscribers may include individuals and/or entities utilizing systems described in the embodiments herein, for lease management, brokering, auditing, etc. Information related to subscriber credentials such as user type (e.g., a subscriber such as an organization such as a business or corporation (e.g., a commercial real estate tenant such as a corporate tenant), a real estate broker, tenants, landlords, and other advisors such as accounting firms and/or the like), username, passwords, administrative authorizations, contact information, general client/user information and/or the like may be stored in application database 104 and/or user database 134. In embodiments described herein, the types of lease calculations allowed to be performed and the user interfaces presented may be based, at least in part, on the user type. A corporate subscriber (e.g., a company or corporation) may have multiple user types associated therewith, such as but not limited to, accounting users or finance users, administration users, corporate users (full-access users), legal users, guest users, broker users, advisor users, etc., and lease management functions allowed by each type of user may be based on credentials and authorizations. For example, when a client/user logs into host/server 102 (e.g., via application front end 106) the username and password of the client/user may be associated with a user type and set of credentials stored in user database 134, and designated lease management and calculation services may be appropriately provided to the user. User types may be further defined within a given subscriber's account. In some embodiments, broker and advisor user types may not be provided with lease accounting and lease administration aspects of the embodiments described herein.

Additionally, amendments and/or proposed amendments, newly created lease analyses (created by following the various stimuli in the program/platform), and competing lease proposals (leases compared against one another via a reporting feature that demonstrates the economic and accounting impacts of the selected, competing lease proposals) may be stored in application database 104 as well as the financial and/or identifying data related thereto.

In some embodiments, the client/user may add, edit or delete proposals, leases, amendments to existing leases stored in application database 104, as well as subleases related to existing or proposed leases. The client/user may view, print, download PDF and Excel/CSV formatted reports and email and/or share reports related to a given lease or set of related lease proposals that are stored in the system, e.g., in application database 104.

Various other details of leases may be stored in application database 104 and may be entered by a client/user in a manner similar to that of the client/user account described above using lease-specific information.

Figure 1B:
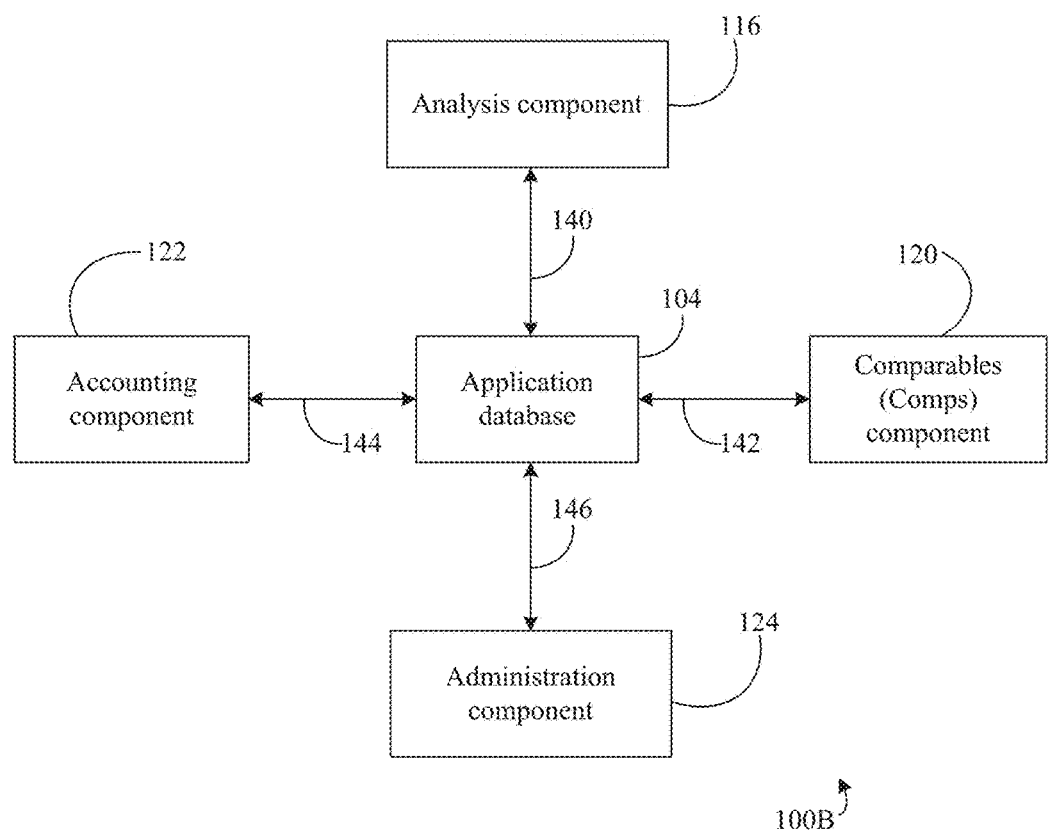
FIG. 1B is a block diagram of data connections related to lease analysis, accounting, administration and market data comparisons, according to another exemplary embodiment.

The components depicted in host/server configuration 100A of FIG. 1A may be configured to share and/or leverage data (i.e., repurpose data) from each other in various ways, in embodiments. For example, FIG. 1B shows a block diagram of a data flow 100B (e.g., a data leveraging/repurposing scheme) between components of host/server 102, according to an embodiment. As shown in FIG. 1B, application database 104 may be communicatively coupled to lease analysis component 116 via a connection 140, to comp component 120 via a connection 142, to lease accounting component 122 via a connection 144, and to lease administration component 124 via a connection 146. While not shown, rule component 118 may also communicate data with application database 104. It should also be noted that while connections between the components shown in FIG. 1B include application database 104, it is contemplated that the components of FIG. 1B may communicate with each other using direct connections (not shown) or by passing through application database 104. In other words, it is further contemplated that in some embodiments, lease analysis component 116, lease accounting component 122, comp component 120, and/or lease administration component 124 may provide their respective data directly to other components in addition to, or in lieu of, providing their data to application database 104.

For example, lease analysis component 116 may perform an analysis of a lease or lease proposal as described in embodiments herein. Various aspects and/or data of the lease analysis performed (e.g., the results) may be stored in application database 104 (e.g., in analysis database 126 of FIG. 1A). In embodiments, later functions and calculations performed by lease accounting component 122, comp component 120, and/or lease administration component 124 may repurpose the lease analysis data and/or results stored in application database 104, or received directly from lease analysis component 116. Similarly, lease accounting component 122, comp component 120, and/or lease administration component 124 may leverage and/or repurpose data from any or all of the other three components when performing subsequent and/or contemporaneous (or substantially contemporaneous) respective functions. It is also contemplated that in some embodiments, a lease analysis (performed by lease analysis component 116) may leverage or repurpose previously compiled data/results from lease accounting component 122, comp component 120, and/or lease administration component 124. That is, when later performing new and/or additional lease analyses, lease analysis component 116 may repurpose other data and/or results from other components directly or that was previously stored in application database 104 in a similar manner as described with respect to data repurposing performed by lease accounting component 122, comp component 120, and/or lease administration component 124 described herein.

Lease calculation systems may be configured in various ways, in embodiments described herein. Lease calculation systems may be used to implement lease calculations and management practices over a network. For example, a host/server may supply or provide access to lease calculation services and/or applications to one or more clients/users. Furthermore, additional structural and operational embodiments, including modifications and/or alterations, will become apparent to persons skilled in the relevant art(s) from the teachings herein.

Figure 2:
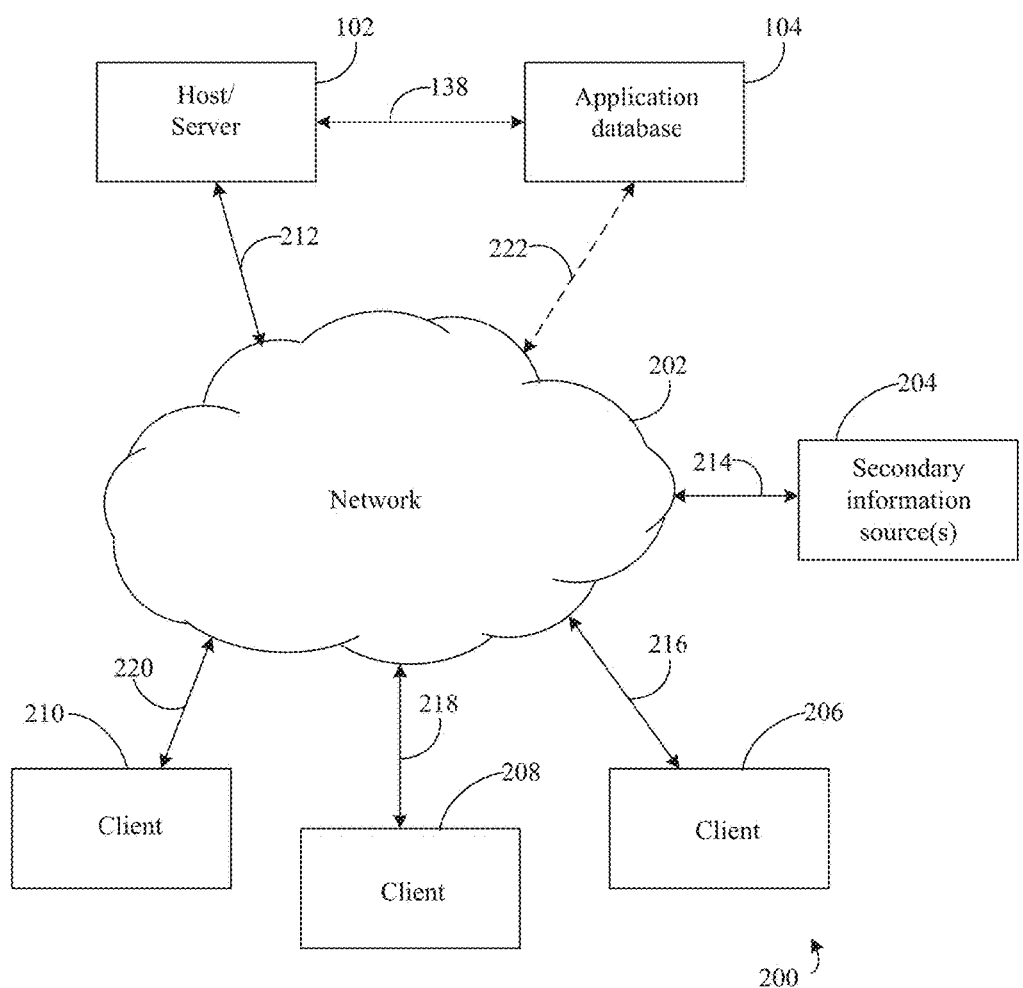
FIG. 2 is a block diagram of a portion of a lease analysis, accounting, administration and market data comparison system, according to an exemplary embodiment.

For example, FIG. 2 shows a block diagram of a portion of a lease calculation network system 200, according to an embodiment. Host/server 102 shown in FIG. 2 may be a further embodiment of host/server 102 depicted in FIG. 1A. As shown in FIG. 2, host/server 102 is configured to communicate with one or more clients (a client 206, a client 208, and a client 210) over a network 202 (e.g., the Internet). Host/server 102 may connect to network 202 via a connection 212. As shown, the one or more clients 206, 208, and/or 210 are also connected to network 202 to facilitate communications between host/server 102 and the client(s), as well as with other devices and information sources connected to network 202: client 206 may connect to network 202 via a connection 216, client 208 may connect to network 202 via a connection 218, and client 210 may connect to network 202 via a connection 220. Network 202 may include wired/wireless connections and/or wired/wireless network portions. Lease calculation network system 200 also includes application database 104 (e.g., as in FIGS. 1A and 1B) that is communicatively coupled to host/server 102 and/or network 202. That is, in embodiments, application database 104 is configured to be accessed by host/server 102 over network 202 via a connection 222 or via other connections such as connection 138.

In embodiments, lease calculation network system 200 also includes one or more secondary information sources 204 connected to network 202 via a connection 214. Secondary information sources 204 are computers, databases, webpages, and/or the like, from which server/host 102, application database 104, and/or client(s) (206, 208, and/or 210) may gather information to be utilized in lease calculation practices and/or applications. For instance, secondary information sources 204 may include, without limitation, brokers and broker services, advisors and advisor services, publicly available real estate information sources, financial institutions and/or information sources, and/or the like. Server/host 102 and/or client(s) (206, 208, and/or 210) may store such gathered information locally, on or via network 202, and/or in application database 104, as described herein.

It should be noted that host/server 102, application database 104, and/or clients 206, 208, and/or 210 shown in FIG. 2 may be implemented as computers (servers, desktops, laptops, tablet computers, etc.), or other processor-based devices, such as smart phones, personal digital assistants, etc. It is contemplated that in the embodiments described, application database 104 may be included within host/server 102 and that host/server 102 may be implemented as one or more physical components or as a distributed computing system as would be understood by a person of skill in the relevant art(s) having the benefit of this disclosure.

Example Operational Embodiments

Figure 3:
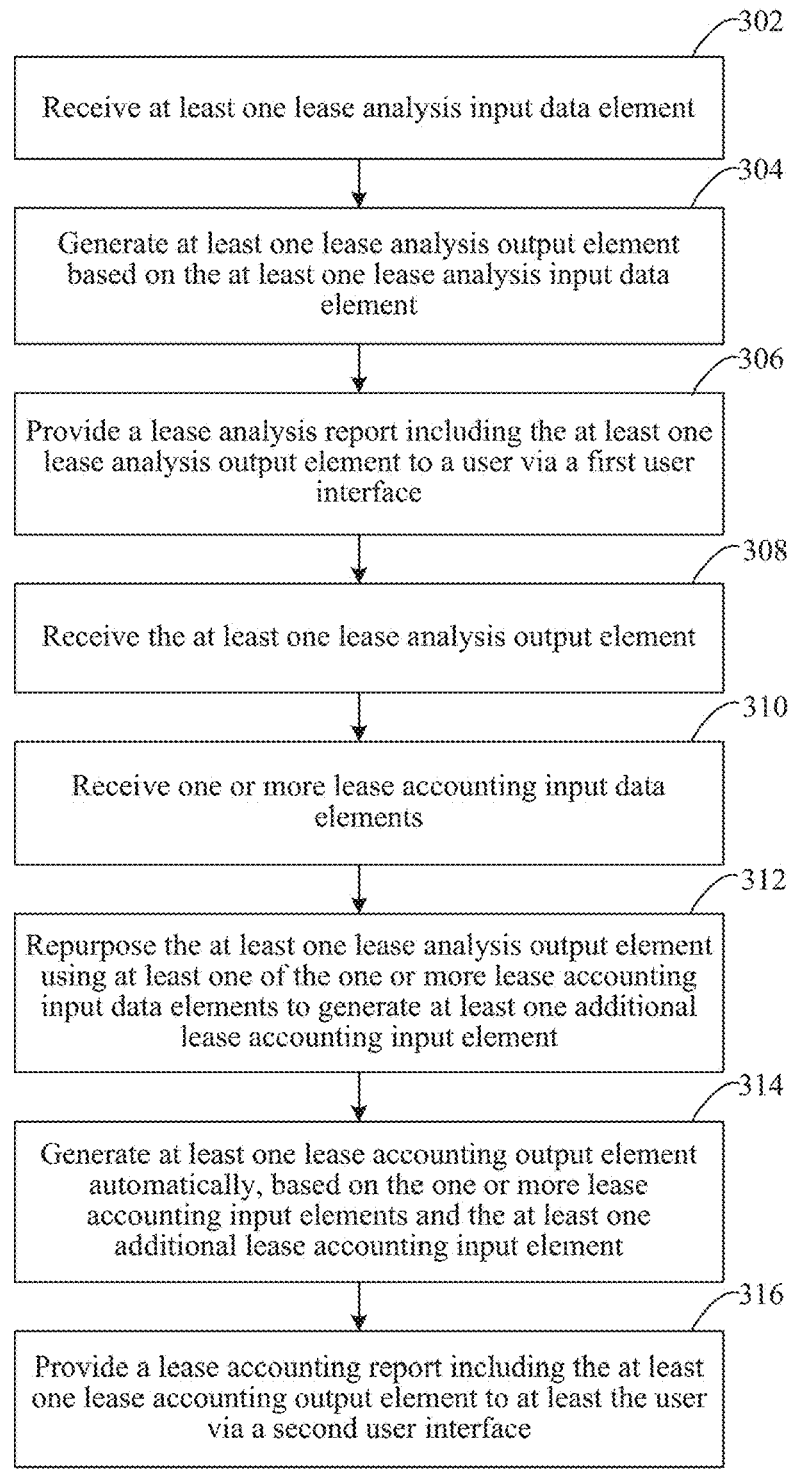
FIG. 3 is a flowchart providing example steps for performing lease calculations, according to a further exemplary embodiment.
Figure 4:
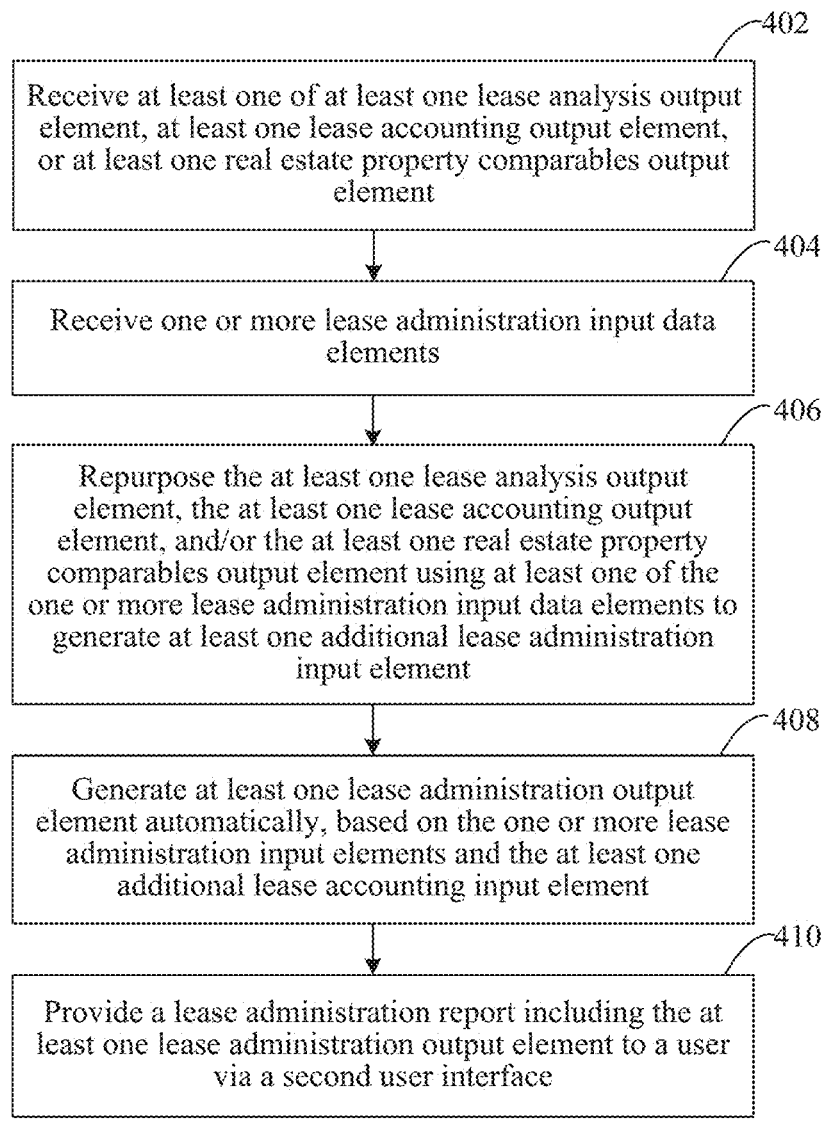
FIG. 4 is a flowchart providing example steps for performing lease calculations, according to a further exemplary embodiment.
Figure 5:
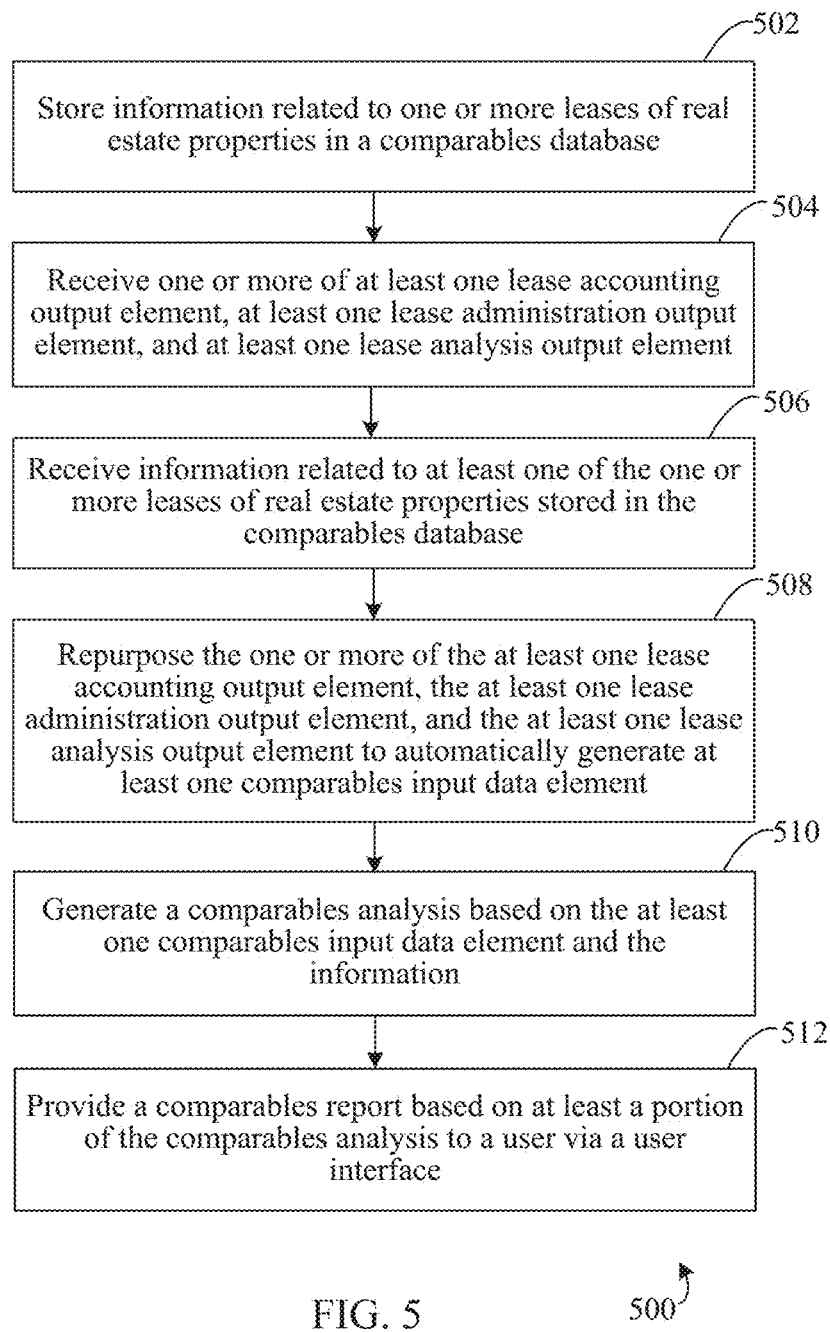
FIG. 5 is a flowchart providing example steps for performing lease calculations, according to a further exemplary embodiment.

The lease calculation embodiments described herein may be performed in various ways. For example, FIGS. 3-5 respectively show flowcharts 300, 400, and 500 providing example steps for performing lease calculations, according to an exemplary embodiments. Host/server 102 and application database 104, as shown in FIG. 1A, along with respective components and elements thereof, clients 206, 208, and 210, as shown in FIG. 2, and computer 3000 of FIG. 30 (described below) may each operate, in whole or in part, according to flowcharts 300, 400, and/or 500 in embodiments. Other structural and operational embodiments will be apparent to persons skilled in the relevant art(s) based on the discussions regarding flowcharts 300, 400, and/or 500. Flowchart 300 is described as follows.

Flowchart 300 may begin with step 302. In step 302, at least one lease analysis input data element is received. The lease analysis input data element may be received by lease analysis component 116. In embodiments, lease analysis input data elements may be entered by a client/user via user information entry component 112 of host/server 102, as shown in FIG. 1A. Additionally, or alternatively, lease analysis input data elements may be received from application database 104 (e.g., from analysis database 126). The lease analysis input data elements may include one or more of the inputs listed in Tables 1A and 1B of FIGS. 6A and 6B.

In step 304, at least one lease analysis output element is generated based on the at least one lease analysis input data element. In one embodiment, lease analysis output element are generated by lease analysis component 116 of FIGS. 1A and 1B, as described herein. In some embodiments, data and information associated with rule component 118, comp component 120, lease accounting component 122, lease administration component 124, and/or application database 104, as shown in FIGS. 1A and 1B, may be used and/or repurposed to generate lease analysis output elements. For example, lease administration data and/or information (e.g., lease administration inputs and/or outputs such as those listed in Tables 3A and 3B of FIGS. 8A and 8B and Table 6 of FIG. 11) may be repurposed by lease analysis component 116 and used to perform lease analysis calculations. Lease analysis component 116 may perform one or more lease analysis calculations to generate lease analysis output elements that include one or more of the lease analysis outputs listed in Table 4 of FIG. 9, in addition to other lease analysis outputs as would be apparent to one of skill in the relevant art(s) having the benefit of this disclosure.

In step 306, a lease analysis report that includes the at least one lease analysis output element is provided to a user via a first user interface. In one embodiment, the lease analysis report is generated by lease analysis component 116 and may be provided to the user via a user interface associated with display component 110 of FIG. 1A. The lease analysis report may include tables, graphs, spreadsheets, maps, and/or the like, and the report may be displayed according to user-specific parameters through filtering.

In step 308, the at least one lease analysis output element is received. For example, lease analysis output elements may be received by a lease accounting component such as lease accounting component 122 of FIG. 1A. The lease analysis output elements may be received from lease analysis component 116 and/or from application database 104, in embodiments.

In step 310, one or more lease accounting input data elements are received. In one embodiment, lease accounting input data elements may be received by a lease accounting component such as lease accounting component 122 of FIG. 1A. Lease accounting input data elements may be entered by a client/user via user information entry component 112 of host/server 102, as shown in FIG. 1A. Additionally, or alternatively, lease accounting input data elements may be received from rule component 118 and/or application database 104 (e.g., from accounting database 130). The lease accounting input data elements may include one or more of the inputs listed in Tables 2A and 2B of FIGS. 7A and 7B.

In step 312, the at least one lease analysis output element is repurposed using at least one of the one or more lease accounting input data elements to generate at least one additional lease accounting input element. Lease accounting component 122 may repurpose lease analysis output elements, as described herein, according to embodiments. For example, a lease analysis output element may be used in a lease accounting calculation along with other lease accounting inputs to provide a more complete accounting calculation and a more comprehensive overview of the client's/user's lease accounting.

In step 314, at least one lease accounting output element is automatically generated, based on the one or more lease accounting input elements and the at least one additional lease accounting input element. Lease accounting component 122 may automatically generate lease accounting output elements from lease accounting calculations performed therein, according to embodiments, that include one or more of the lease accounting outputs listed in Table 5 of FIG. 10, in addition to other lease accounting outputs as would be apparent to one of skill in the relevant art(s) having the benefit of this disclosure.

In step 316, a lease accounting report that includes the at least one lease accounting output element is provided to at least the user via a second user interface. In one embodiment, the lease accounting report is generated by lease accounting component 122 and may be provided to the user via a user interface associated with display component 110 of FIG. 1A. The lease accounting report may include tables, graphs, spreadsheets, maps, and/or the like, and the report may be displayed according to user-specific parameters through filtering.

In some example embodiments, one or more steps 302, 304, 306, 308, 310, 312, 314, and/or 316 of flowchart 300 may not be performed. Moreover, steps in addition to or in lieu of steps 302, 304, 306, 308, 310, 312, 314, and/or 316 may be performed. Further, in some example embodiments, one or more of steps 302, 304, 306, 308, 310, 312, 314, and/or 316 may be performed out of order, in an alternate sequence, or partially (or completely) concurrently with other steps.

Flowchart 400 is described as follows.

Flowchart 400 may begin with step 402. In step 402, at least one of at least one lease analysis output element, at least one lease accounting output element, or at least one real estate property lease comparables output element is received. The elements described in this step may be received by lease administration component 124. In embodiments, the received elements may be entered by a client/user via user information entry component 112 of host/server 102, as shown in FIG. 1A. Additionally, or alternatively, the received output elements may be received from rule component 118 and/or application database 104 (e.g., from analysis database 126, comp database 128, and/or accounting database 130). The lease analysis output data elements may include one or more of the outputs listed in Table 4 of FIG. 9 (or one or more of the inputs listed in Tables 1A and 1B of FIGS. 6A and 6B, in embodiments), and the lease accounting output data elements may include one or more of the outputs listed in Table 5 of FIG. 10 (and/or one or more inputs listed in Tables 2A and 2B of FIGS. 7A and B).

In step 404, one or more lease administration input data elements are received. In one embodiment, lease administration input data elements may be received by a lease administration component such as lease administration component 124 of FIG. 1A. Lease administration input data elements may be entered by a client/user via user information entry component 112 of host/server 102, as shown in FIG. 1A. Additionally, or alternatively, lease administration input data elements may be received from application database 104 (e.g., from administration database 132). The lease administration input data elements may include one or more of the inputs listed in Tables 3A and 3B of FIGS. 8A and 8B. For example, lease administration input data elements may include a lease administration policy of the user, a lease administration procedure of the user, a lease administration preference of the user, and/or user-specified lease administration data.

In step 406, the at least one lease analysis output element, the at least one lease accounting output element, and/or the at least one real estate property comparables output element is repurposed using at least one of the one or more lease administration input data elements to generate at least one additional lease administration input element. Lease administration component 124 may perform this repurposing, as described herein, according to embodiments. For example, lease analysis output elements, lease accounting output elements, and/or real estate property comparables output elements may be used in a lease administration calculation and/or an administrative analysis along with other lease administration inputs to provide a more complete administration calculation and a more comprehensive overview of the client's/user's lease administration.

In step 408, at least one lease administration output element is automatically generated, based on the one or more lease administration input elements and the at least one additional lease administration input element. Lease administration component 124 may automatically generate lease administration output elements from lease administration calculations and/or administration analyses performed therein, according to embodiments, that include one or more of the lease administration outputs listed in Table 6 of FIG. 11, in addition to other lease administration outputs as would be apparent to one of skill in the relevant art(s) having the benefit of this disclosure. For instance, a lease expiration date, a lease commencement date, a lease option exercise date, renewal options, a lease abstract, a square footage value associated with a lease, current rent, remaining rent obligations, termination options, expansion options, insurance requirements, sublease rights, and assignment rights, may each be a lease administration output.

In step 410, a lease administration report that includes the at least one lease administration output element is provided to a user via a user interface. In one embodiment, the lease administration report is generated by lease administration component 124 and may be provided to the user via a user interface associated with display component 110 of FIG. 1A. The lease administration report may include tables, graphs, spreadsheets, maps, and/or the like, and the report may be displayed according to user-specific parameters through filtering.

In some example embodiments, one or more steps 402, 404, 406, 408, and/or 410 of flowchart 400 may not be performed. Moreover, steps in addition to or in lieu of steps 402, 404, 406, 408, and/or 410 may be performed. Further, in some example embodiments, one or more of steps 402,

404, 406, 408, and/or 410 may be performed out of order, in an alternate sequence, or partially (or completely) concurrently with other steps.

Flowchart 500 is described as follows.

Flowchart 500 may begin with step 502. In step 502, information related to one or more real estate properties is stored in a comparables database. In embodiments, application database 104 of FIG. 1A may store the information (e.g., in comp database 128). As noted herein, the information may include data associated with existing and/or proposed leases. The properties may be associated with a client/user or with a broker and/or an advisor. In some embodiments, information related to multiple clients/users, brokers, and/or advisors may be stored in application database 104, and may be accessible (e.g., shared) by one or more clients/users.

In step 504, one or more of at least one lease accounting output element, at least one lease administration output element, or at least one lease analysis output element are received. The output elements described in this step may be received by comp component 120. In embodiments, the received elements may be entered by a client/user via user information entry component 112 of host/server 102, as shown in FIG. 1A. Additionally, or alternatively, the received output elements may be received from rule component 118 and/or application database 104 (e.g., from analysis database 126, administration database 132, and/or accounting database 130). The output elements may include one or more of the outputs listed in Table 4 of FIG. 9 (or one or more of the inputs listed in Tables 1A and 1B of FIGS. 6A and 6B, in embodiments), the lease accounting output data elements may include one or more of the outputs listed in Table 5 of FIG. 10 (and/or one or more inputs listed in Tables 2A and 2B of FIGS. 7A and 7B), and the lease administration output data elements may include one or more of the outputs listed in Table 6 of FIG. 11 (and/or one or more inputs listed in Tables 3A and 3B of FIGS. 8A and 8B).

In step 506, information related to at least one of the one or more real estate properties stored in the comparables database is received. In one embodiment, the information may be stored in application database 104 (e.g., in comp database 128), as described in step 502, and received by comp component 120. It should be noted that the information received may be associated with one or more users respectively associated with one or more subscribers. That is, information associated with non-affiliated users (e.g., users from different subscribers, such as different companies) may be received and used according to flowchart 500.

In step 508, the one or more of the at least one lease accounting output element, the at least one lease administration output element, and the at least one lease analysis output element are repurposed to automatically generate at least one comparables input data element Comp component 120 may perform this repurposing, as described herein, according to embodiments. For example, lease analysis output elements, lease accounting output elements, and/or lease administration output elements may be used in a market data comparables (comp) calculation, along with other received comp information, in embodiments, to provide a more complete comparables calculation and a more comprehensive overview of the client's/user's lease options and comparisons.

In step 510, a comparables analysis is generated based on the at least one comparables input data element and the information. In one embodiment, comp component 120 may generate comparables analyses from comp calculations and/or comp analyses performed therein. In some embodiments, the comparables analysis may correlate and/or analyze market information.

In step 512, a comparables report based on at least a portion of the comparables analysis is provided to a user via a user interface. In one embodiment, the comparables report is generated by comp component 120 and may be provided to the user via a user interface associated with display component 110 of FIG. 1A. The comp report may include comparisons of properties under lease and/or for proposed leases. The properties may be associated with a client/user, with a broker, and/or with an advisor. In some embodiments, information related to multiple clients/users, brokers, and/or advisors may be included in the comp report. In some embodiments, the comp report may display market information. The comp report may include tables, graphs, spreadsheets, maps, and/or the like, and the report may be displayed according to user-specific parameters through filtering.

In some example embodiments, one or more steps 502, 504, 506, 508, 510, and/or 512 of flowchart 500 may not be performed. Moreover, steps in addition to or in lieu of steps 502, 504, 506, 508, 510, and/or 512 may be performed. Further, in some example embodiments, one or more of steps 502, 504, 506, 508, 510, and/or 512 may be performed out of order, in an alternate sequence, or partially (or completely) concurrently with other steps.

Additional structural and operational embodiments, including modifications and/or alterations, will become apparent to persons skilled in the relevant art(s) from the teachings herein with respect to flowcharts 300, 400, and 500.

Example Lease Calculations, Data, and Information

Various functions, analyses, and platforms may be utilized in performing lease calculations. This section describes exemplary lease calculation embodiments as well as examples of data and information used for lease calculations. The embodiments described in this section may be performed by platforms such as host/server 102 or by a software application that resides in the client(s) or with the user(s), although other embodiments are contemplated for performing lease calculations.

As noted herein, various embodiments repurpose data and information associated with one aspect of lease management and associated lease calculations to be used by other aspects of lease management. For instance, outputs (and/or inputs) of a lease analysis may be repurposed and used as part of an input data set for lease accounting calculations, lease administration calculations, and comps. Likewise, lease accounting outputs (and/or inputs) may be repurposed and used as part of an input data set for lease analysis calculations, lease administration calculations, and comps, lease administration outputs (and/or inputs) may be repurposed and used as part of an input data set for lease analysis calculations, lease accounting calculations, and comps, and comps outputs (and/or inputs) may be repurposed and used as part of an input data set for lease analysis calculations, lease accounting calculations, and lease administration calculations. What follows now is an exemplary, non-exhaustive description of data and information associated with some aspects of lease management.

FIGS. 6A and 6B show Tables 1A and 1B that include example input data elements for lease analysis calculations. Types of lease analysis input data elements include basic information, premises, base rent, additional rent, miscellaneous rent, percentage rent, parking, tenant improvements (TI) and initial costs, and/or the like.

FIG. 9 shows Table 4 that includes example output elements resulting from lease analysis calculations. In embodiments, the example input data elements for lease analysis calculations described above may also be example lease analysis output elements.

FIGS. 7A and 7B show Tables 2A and 2B that include example input data elements for lease accounting calculations. Types of lease accounting input data elements include borrowing rate, FAS 13/IAS 17 capital lease test and "Type A" vs. "Type B" lease test, renewal and termination options, disguised rent, general ledger and cost center, user rules, and/or the like.

FIG. 10 shows Table 5 that includes example output elements resulting from lease accounting calculations. In embodiments, the example input data elements for lease accounting calculations described above may also be example lease accounting output elements.

FIGS. 8A and 8B show Tables 3A and 3B that include example input data elements for lease administration calculations and analyses. Types of lease administration input data elements include notice and payment information, critical dates, as well as other options and other provisions, and/or the like.

FIG. 11 shows Table 6 that includes example output elements resulting from lease administration calculations and analyses. In embodiments, the example input data elements for lease administration calculations described above may also be example lease administration output elements.

Lease management, including the various lease calculations and analyses associated therewith, may be performed in accordance with the embodiments described herein. The following are exemplary, illustrative descriptions of a portion of the lease calculations and analyses contemplated that utilize data and information repurposing.

In one embodiment, a lease calculation may be performed by a lease accounting component such as accounting component 122 to repurpose and/or leverage the lease analysis and/or lease administration data and process (which have historically been a stand-alone processes focused solely on the cash flows and/or payments required under the terms of a lease performed in a Microsoft® Excel spreadsheet or the like), to generate all of a tenant's lease accounting calculations, and related journal entries for its financial reporting and financial statements (e.g., for a corporate subscriber), including (a) current accounting rule effects, (b) new/future accounting rule effects and (c) the financial reporting requirements the tenant must adhere to (i.e., comparative financial statements, future commitments, interest and amortization expense, etc.), thereby expediting and economizing a commercial real estate tenant's (e.g., a corporate tenant's) transition to the new accounting rules by leveraging the time and labor their real estate brokers and/or other advisors spent in creating lease analyses in order to repurpose the lease analysis data and process to generate the full, detailed set of lease accounting calculations and related journal entries for the tenant's financial reporting and statements.

In one embodiment, a lease calculation may be performed by an administration component such as administration component 124 to track and administer the existing/executed leases and amendments in a tenant's or group of tenants' lease portfolios, including tracking and reporting of critical dates such as lease expirations, option exercise dates, etc.

In one embodiment, a lease calculation may be performed by a comp component such as comp component 120 to aggregate and repurpose the lease analysis and/or lease accounting and/or lease administration data from multiple, unrelated users in order to obtain and/or create data and reports on lease comparables, on a national, regional, local or sub-market basis (e.g., down to a zip-code level), by building type and class, in order to allow users to be able to visualize and report on past, current, and trending base rent rates, net effective rental rates and other lease terms from (a) the most current lease proposals entered in the lease calculation platform, and (b) the executed leases entered in the lease calculation platform based on the dates the various leases were negotiated and/or were executed, all in order to determine the most current direction and analysis of rental rates for commercial real estate. In embodiments, such a report may be referred to as a benchmark data report and may include an aggregated comparison between a plurality of leases for real estate properties associated with the first user and a plurality of leases for real estate properties associated with the one or more other users not affiliated with the first user In one embodiment, a lease calculation may be performed by a lease accounting component such as accounting component 122 to create a detailed financial analysis of any real estate lease or group of leases under both the current and new (anticipated effective 2017) lease accounting rules from the FASB and the IASB, including the related cash flow, balance sheet and profit and loss (P&L) accounting impacts from any lease during the fiscal periods before and after the new rules go into effect, and including customized reporting and graphical analysis incorporating the tenant's fiscal year, borrowing rates, other financial requirements and other industry standards of analyzing the economics of any contemplated or executed lease transaction. In one embodiment, a lease calculation function may understand and automatically calculate the impact on a tenant's earnings before interest, tax, depreciation and amortization (EBITDA) versus full income statement financial results from any proposed or existing lease or group of leases resulting from the implementation and transition to the new accounting rules.

In one embodiment, a lease calculation may be performed by a lease accounting component such as accounting component 122 to automatically compare and contrast competing lease proposals against one another, leveraging the lease analysis for each competing proposal to dynamically generate financial reports and analyses, thereby allowing the user to evaluate which is the better lease from both a financial/economic and an accounting perspective under both existing and new lease accounting and calculation standards.

In one embodiment, a lease calculation may be performed by a lease accounting component such as accounting component 122 to further expedite and economize a commercial real estate tenant's transition to the new accounting rules, and enable the tenant to continue to adhere to the new rules after they are in effect, by allowing the full, detailed set of lease accounting and related journal entries within the lease calculation platform to be linked and/or otherwise uploaded into the tenant's accounting system and/or software package (e.g., enterprise resource planning (ERP) systems such as Oracle®, SAP®, Lawson®, Sage®, Epicor®, Microsoft®, etc.). For instance, the full accounting impacts related to a lease renewal, under existing accounting standards or future accounting standards or both, may be completely and fully analyzed and results may be linked or uploaded into a user's ERP/accounting system.

In one embodiment, a lease calculation may be performed by a lease accounting component such as accounting component 122 to automate and correctly analyze the accounting and other financial impacts (including administration-related impacts), resulting from any amendment to a lease (or any number of amendments to a lease), whether that amendment has been executed or is a proposed amendment to an existing lease, by implementing a dynamic user interface that is customized based upon the kind of changes being made to the original/existing lease via the amendment. Representations of lease amendments may be entered by a user, may be received from a third party, may be received from a lease analysis component, a lease accounting component, a lease administration component, and/or a database, such as those described herein.

In one embodiment, a lease calculation may be performed by a lease accounting component such as accounting component 122 to expedite the lease negotiation and approval process with brokers, tenants and landlords by allowing each to share any lease analysis or lease accounting within their respective library of leases with other registered users of the lease calculation platform (and/or unregistered users of the lease calculation platform on a "guest" basis), thereby allowing parties to a lease negotiation to have better clarity of the economic terms of a proposed lease (or amendment) and avoid miscommunications.

In one embodiment, a lease calculation may be performed by a lease accounting component such as accounting component 122 to turn the many subjective decisions/determinations included in the new accounting standards into objectively determinable and auditable processes and answers, such that the effect of these issues (e.g., does the tenant have a "significant economic incentive" to renew or terminate its lease, is a tenant's percentage rent or other contingent rent payments really "disguised minimum rent,", etc.), on a tenant's lease accounting is consistently and objectively determined across its portfolio of leases based upon the tenant's answers to a series of related questions in the lease calculation platform which are then utilized to generate the respective decisions/determinations.

In one embodiment, a lease calculation may be performed by a lease accounting component such as accounting component 122 to test, validate and/or correct the user's assumptions as to whether or not a given lease qualifies (a) as an operating or capital lease under existing lease accounting rules (e.g., Financial Accounting Standards (FAS) 13 and/or International Accounting Standards (IAS) 17), and (b) for "Type A" or "Type B" accounting treatment, or any other promulgated accounting treatment, under the new lease accounting rules, by virtue of applying the associated financial/lease analysis results against a series of answers to the subject accounting rules' questions/criteria for determining the correct accounting treatment, and thereby creating an objectively determinable and auditable accounting treatment.

In one embodiment, a component(s) that performs a lease calculation may repurpose the lease-related data entered for purposes of providing and/or obtaining lease administration and management reporting information and results in order to (a) generate lease accounting data and reports, as more fully described above, (b) generate lease analysis data and reports, as more fully described above, and/or (c) generate lease "comps" data and reports, as more fully described above.

In one embodiment, a component(s) that performs a lease calculation function may repurpose the lease-related data entered for purposes of providing/generating lease accounting data and reporting information in order to generate lease analysis data and reports, as more fully described above.

Example User Interface Embodiments

Lease-related data and information may be obtained and/or provided (e.g., to and/or from a client/user or to a database) in various ways, according to embodiments. For instance, data and information may also be received from, or provided to, a client/user through a user interface(s). User information entry component 112 of FIG. 1A may be configured to provide one or more user interfaces described herein to a user via display component 110. Example user interface embodiments are described in this section with respect to FIGS. 12-29. Furthermore, additional structural and operational embodiments, including modifications and/or alterations, will become apparent to persons skilled in the relevant art(s) from the teachings herein.

Figure 12:
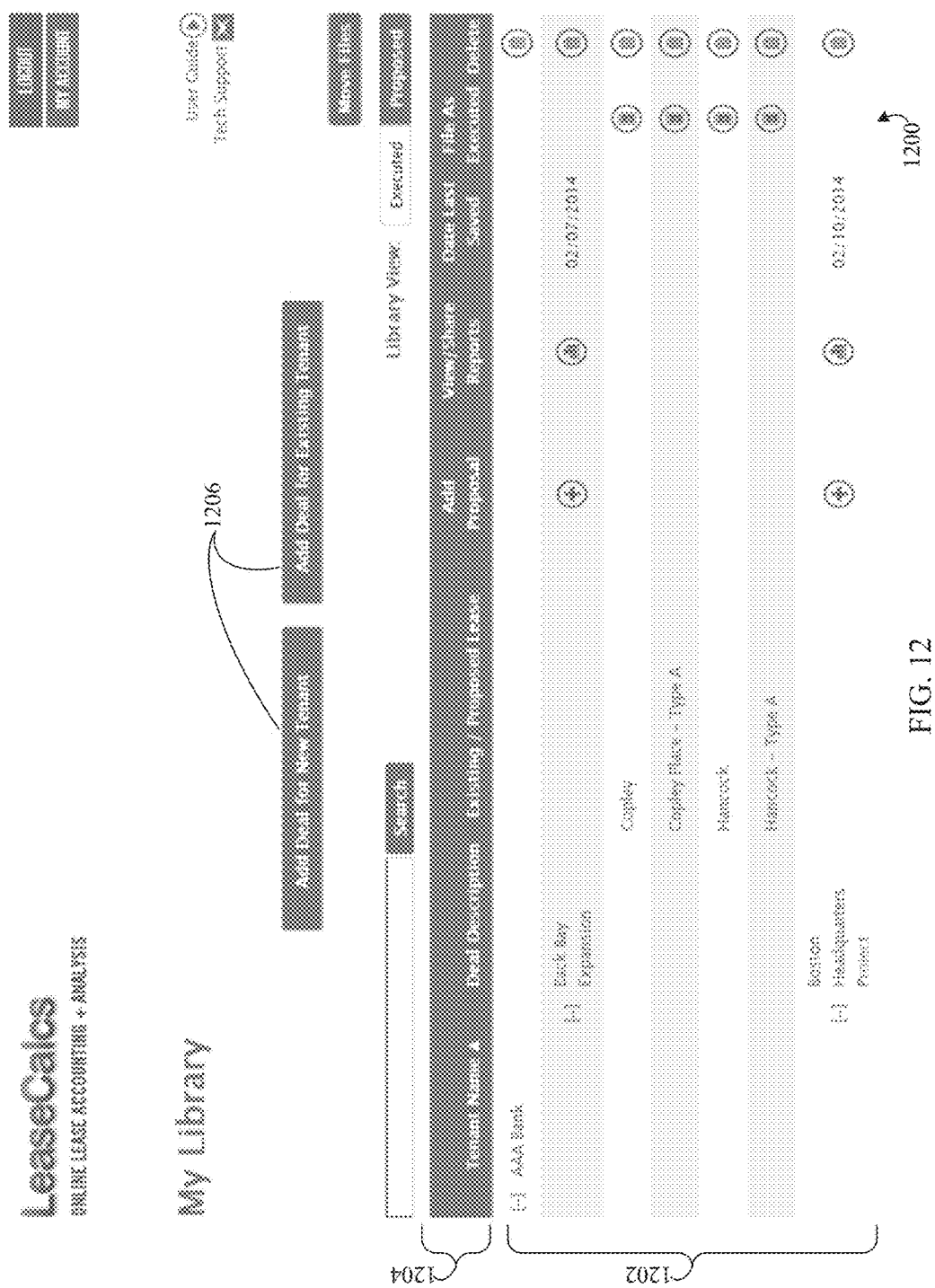

FIG. 12 shows a portion of an example library user interface 1200, according to an embodiment. Library user interface 1200 is configured to provide one or more entries of a client/user portfolio for display to the client/user. For instance, one or more lease entries 1202 may be provided under descriptive columns 1204 to the client/user. Library user interface 1200 is also configured to allow a client/user to add a lease to the portfolio by selecting one of buttons 1206. FIGS. 13-19 show example user interfaces related to the lease added via buttons 1206 or existing lease entries 1202 being selected.

FIG. 13 shows a portion of an example questionnaire user interface 1300, according to an embodiment. Questionnaire user interface 1300 may follow library user interface 1200 after one of buttons 1206 has been selected. Questionnaire user interface 1300 is configured to provide one or more questions 1302 to a client/user and to allow entry of answers by the client/user. Answers to questions 1302 may be used as lease analysis input data elements in embodiments.

Figure 14:
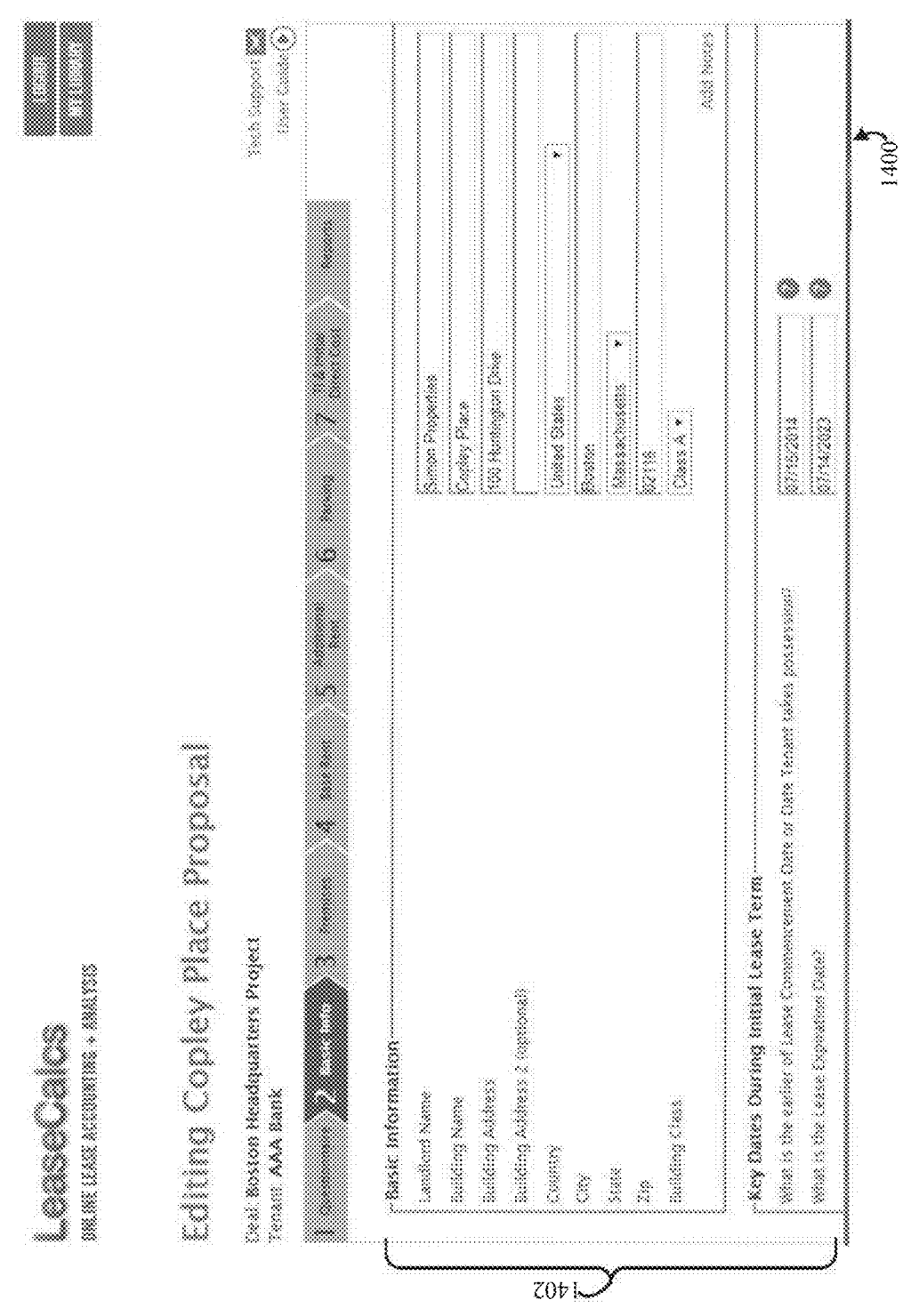

FIG. 14 shows a portion of an example basic information user interface 1400, according to an embodiment. Basic information user interface 1400 may follow questionnaire user interface 1300. Basic information user interface 1400 is configured to allow a user to provide one or more basic information entries 1402 related to basic information of a lease. For instance, one or more basic information entries 1402 may relate to general property description, lease dates, and/or the like. Basic information entries 1402 may be used as lease analysis input data elements in embodiments.

Figure 15:
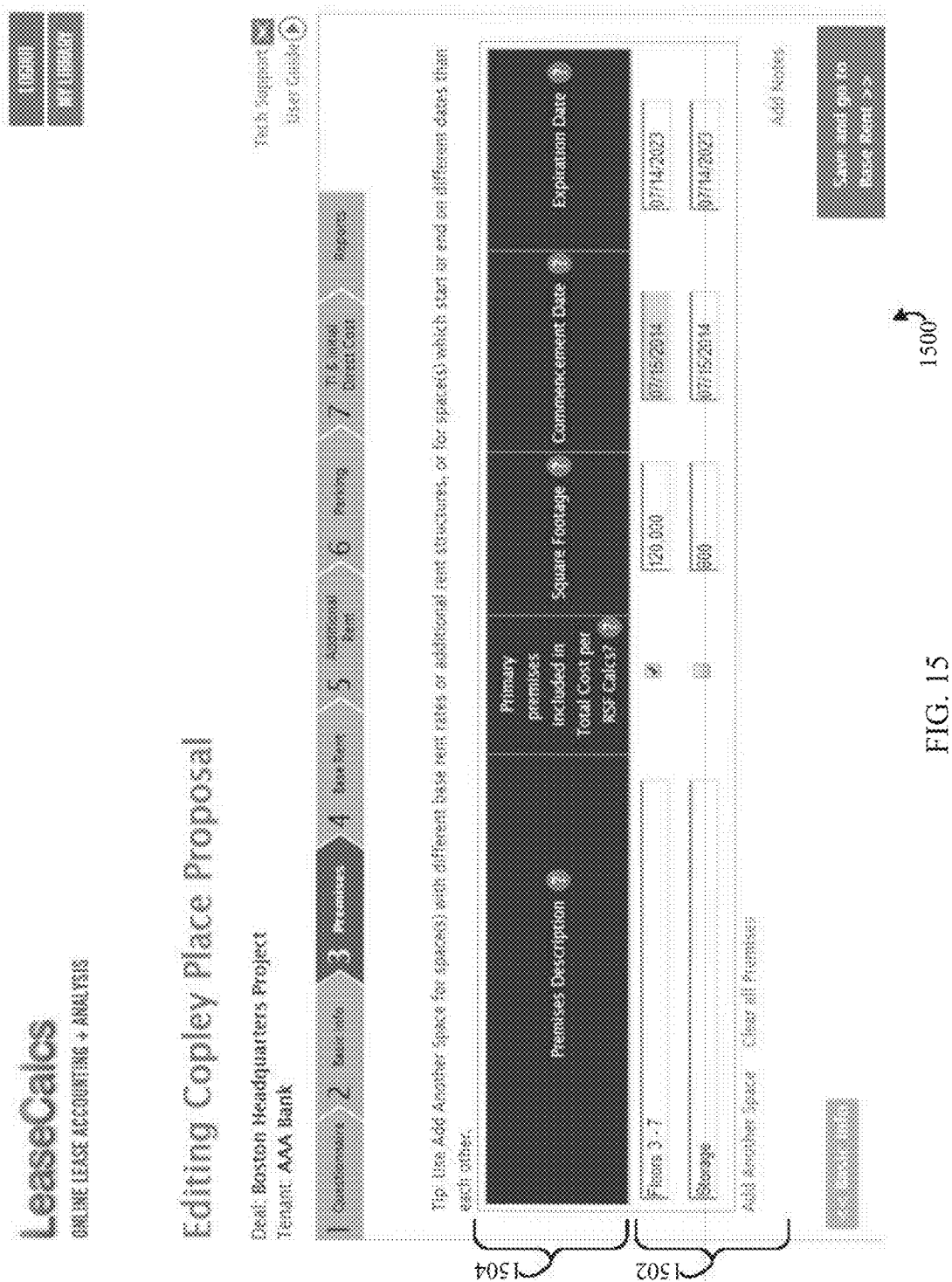

FIG. 15 shows a portion of an example premises user interface 1500, according to an embodiment. Premises user interface 1500 may follow basic information user interface 1400. Premises user interface 1500 is configured to allow a user to provide one or more premises entries 1502 related to specific information of a lease property under descriptive columns 1504. For instance, one or more information entries 1502 may relate to particular areas of the property, specific lease dates associated with the areas, and/or the like. Premises entries 1502 may be used as lease analysis input data elements in embodiments.

Figure 16:
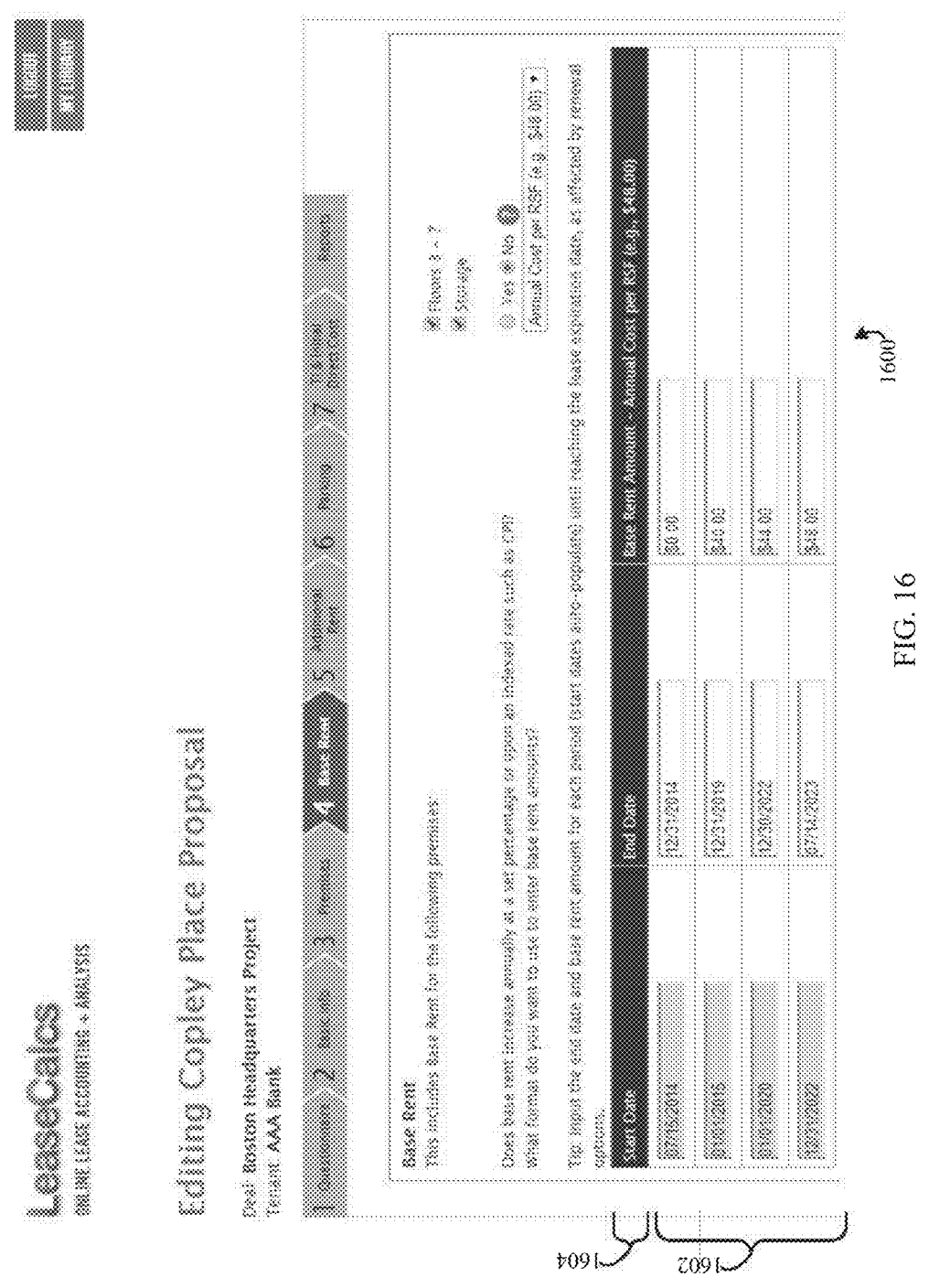

FIG. 16 shows a portion of an example base rent user interface 1600, according to an embodiment. Base rent user interface 1600 may follow premises user interface 1500. Base rent user interface 1600 is configured to allow a user to provide one or more base rent entries 1602 related to base rent values of a lease under descriptive columns 1604. Base rent entries 1602 may be used as lease analysis input data elements in embodiments.

Figure 17:
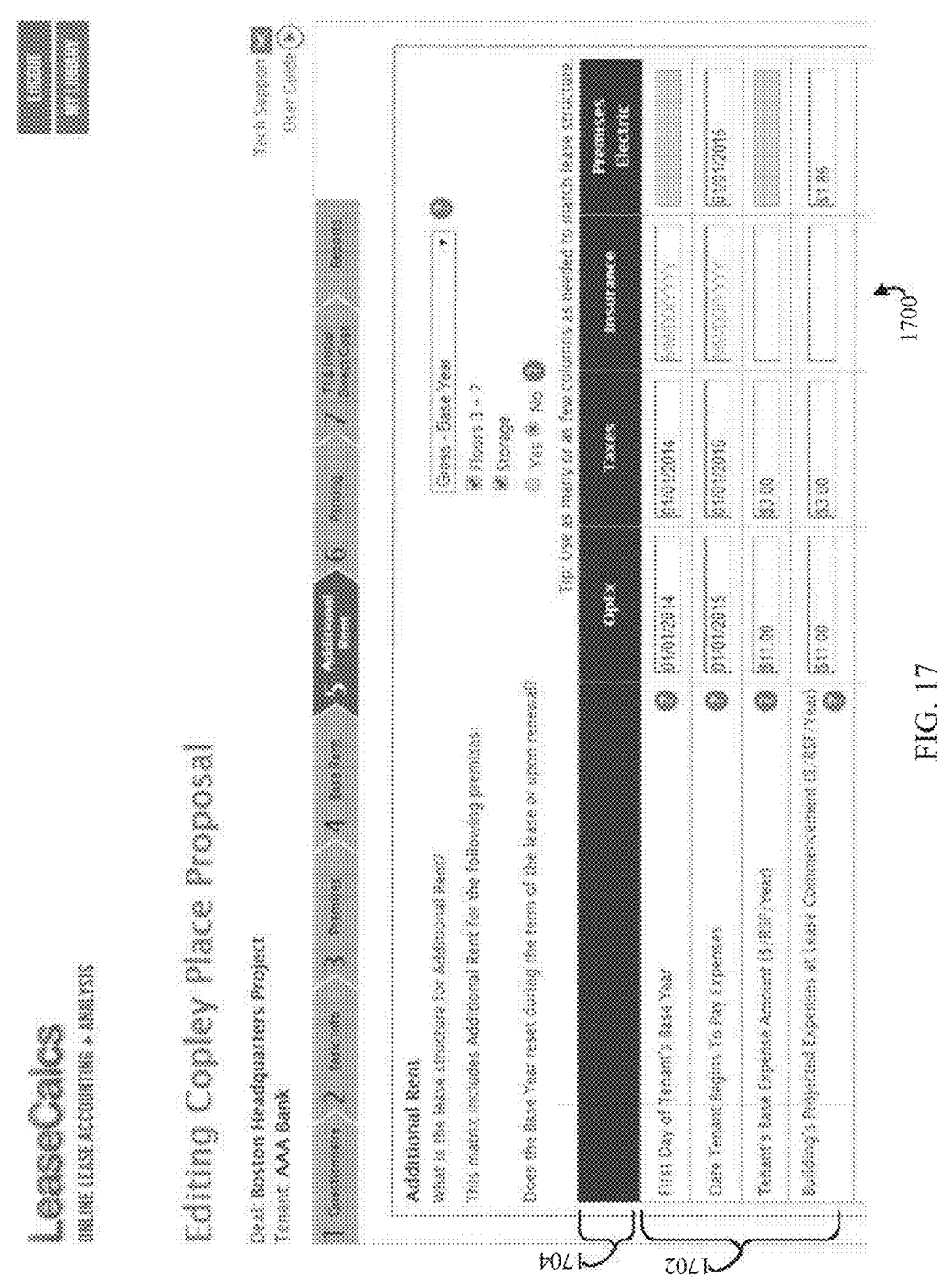

FIG. 17 shows a portion of an example additional rent user interface 1700, according to an embodiment. Additional rent user interface 1700 may follow base rent user interface 1600. Additional rent user interface 1700 is configured to allow a user to provide one or more additional rent entries 1702 related to additional rent values of a lease under descriptive columns 1704. Additional rent entries 1702 may be used as lease analysis input data elements in embodiments.

Figure 18:
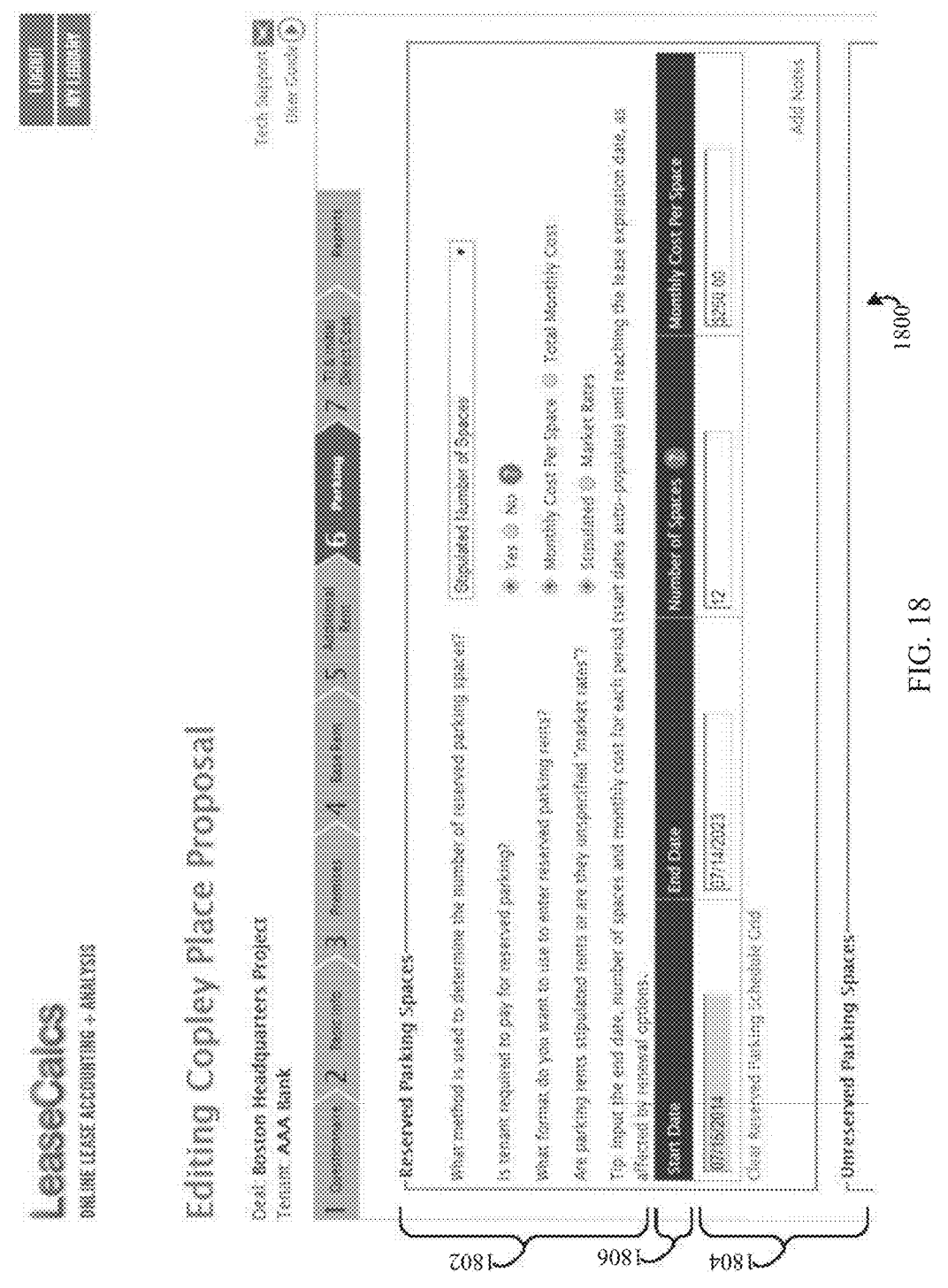

FIG. 18 shows a portion of an example parking user interface 1800, according to an embodiment. Parking user interface 1800 may follow additional rent user interface 1700. Parking user interface 1800 is configured to provide one or more parking questions 1802 to a client/user and to allow entry of parking answers by the client/user. Parking user interface 1800 is also configured to allow a user to provide one or more parking entries 1804 related to parking for a lease under descriptive columns 1806. Answers to parking questions 1802 and parking entries 1804 may be used as lease analysis input data elements in embodiments.

Figure 19:
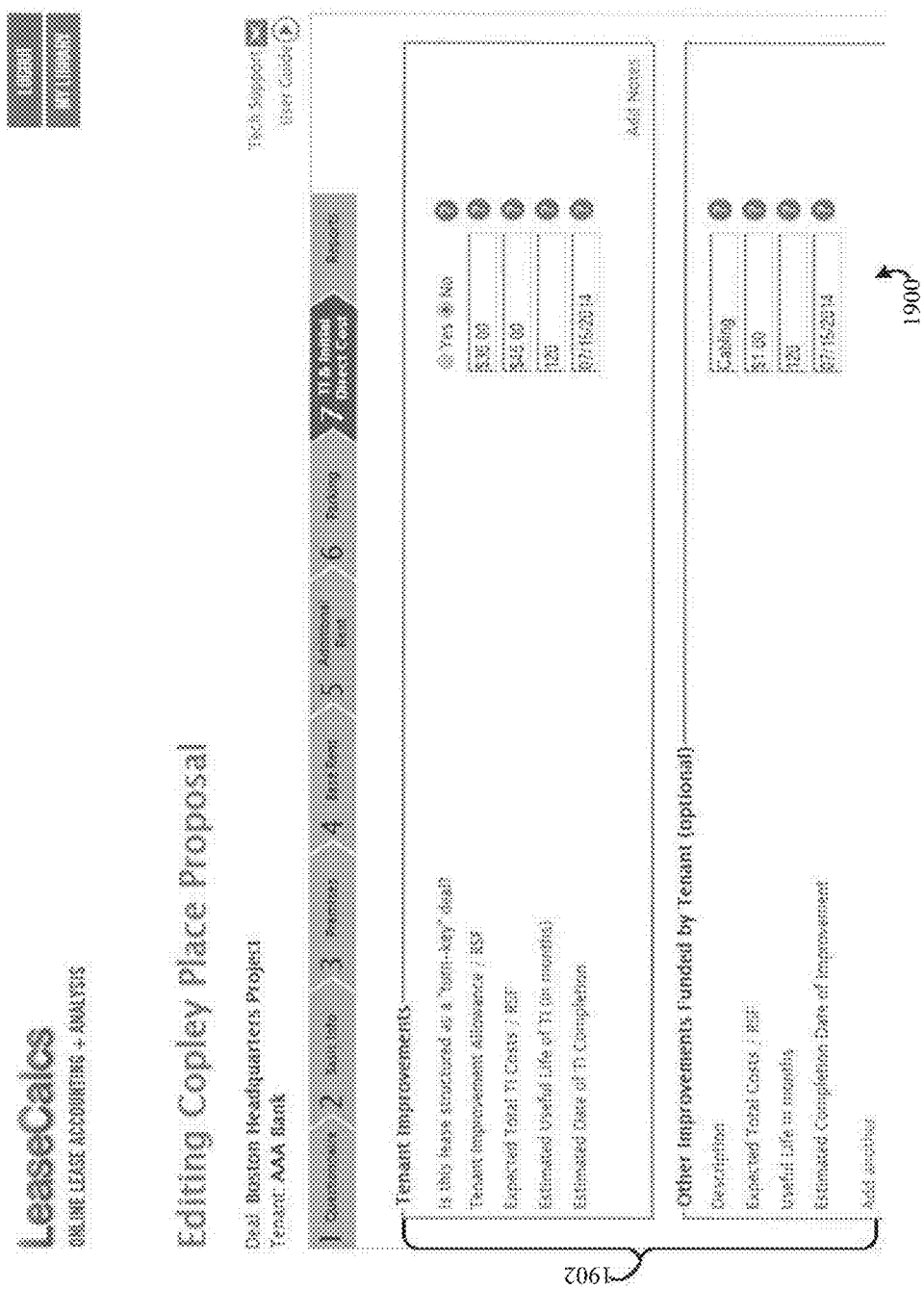

FIG. 19 shows a portion of an example improvement costs user interface 1900, according to an embodiment. Improvement costs user interface 1900 may follow parking user interface 1800. Improvement costs user interface 1900 is configured to allow a user to provide one or more TI and other improvement entries 1902 related to property improvements for a lease. TI and other improvement entries 1902 may be used as lease analysis input data elements in embodiments.

Figure 20:
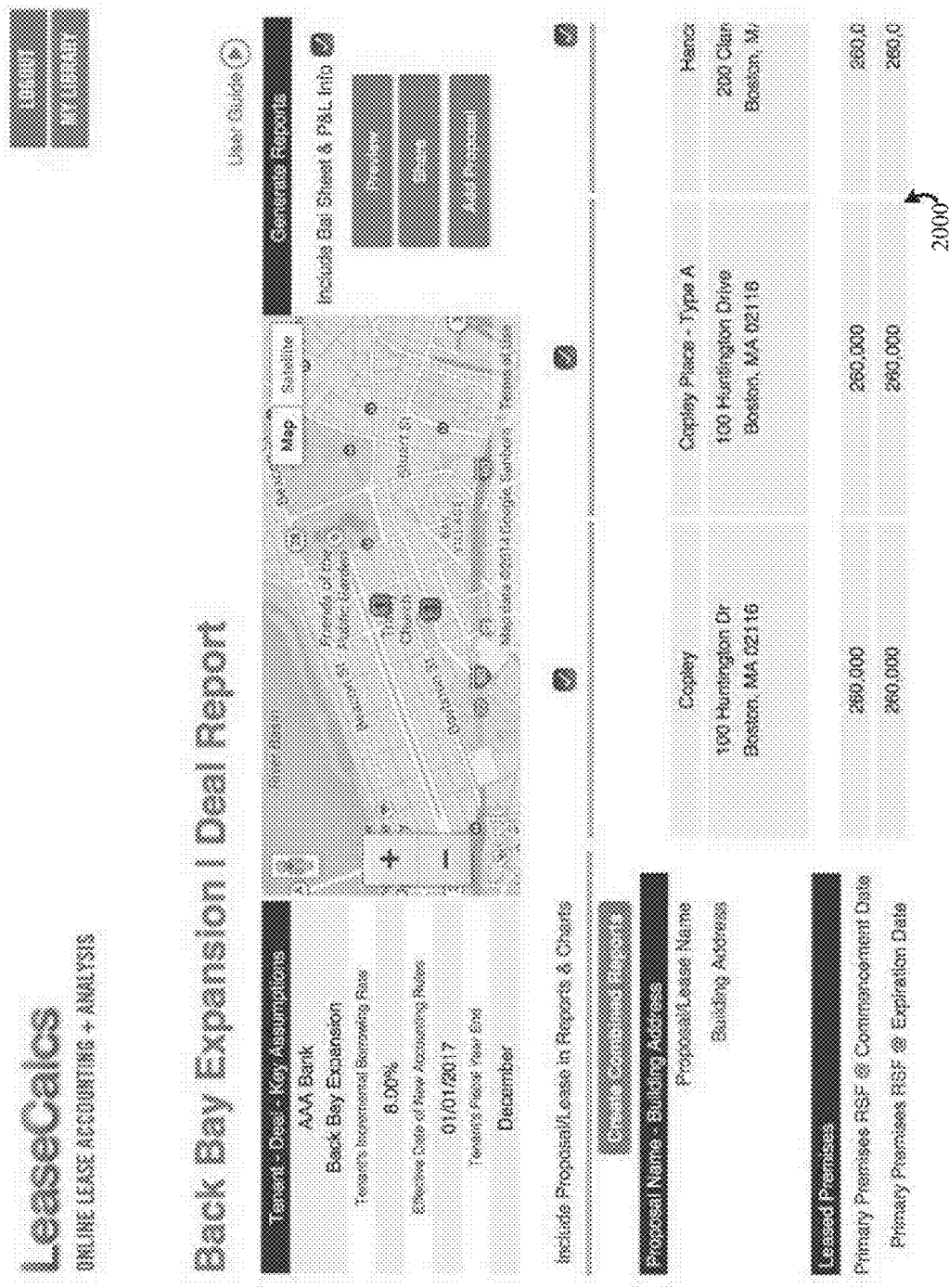
FIG. 20 is a portion of a user interface for displaying a report related to a lease analysis calculation, according to an exemplary embodiment.

Turning now to FIG. 20, a portion of a lease analysis report user interface 2000 is shown, according to an embodiment. For example, lease analysis report user interface 2000 may provide to a user a lease analysis report based upon data and information entered according to the interfaces described above with respect to FIGS. 12-19. The provided report may be generated automatically, and may include repurposed data (e.g., from a previously performed lease administration calculation and/or analysis) as described herein.

User interfaces may also be configured as "dashboards" for various types of users.

Figure 21:
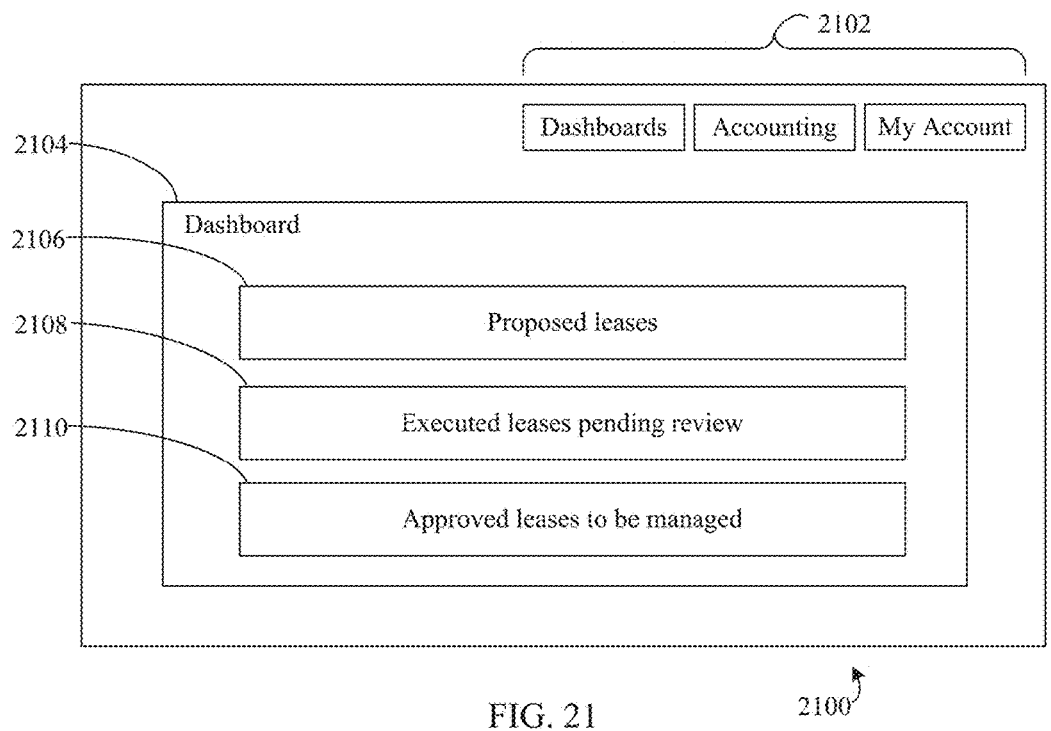
FIGS. 21-29 are portions of user interfaces for lease management, according to exemplary embodiments.

For instance, FIG. 21 shows a portion of an example corporate tenant dashboard interface 2100. In an embodiment, corporate tenant dashboard interface 2100 may be a dashboard tailored to lease accounting. Corporate tenant dashboard interface 2100 may include one or more selectable view buttons 2102 configured to alternate between different modes and dashboard views of the corporate tenant user. Corporate tenant dashboard interface 2100 may also include a dashboard view 2104 with selectable elements. The selectable elements, as shown in FIG. 21, include a proposed lease element 2106, an executed leases pending review element 2108, and an approved leases to be managed element 2110. Corporate tenant dashboard interface 2100 is configured to allow the user to select a selectable element and provide a user interface with information and/or lease management options related to the element selected.

Figure 22:
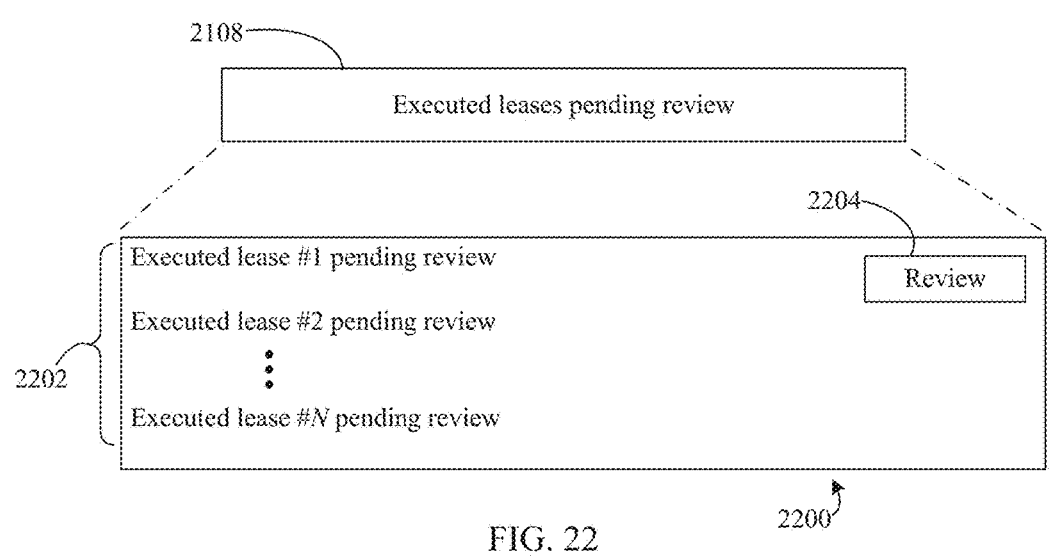

For example, FIG. 22 shows a portion of an example executed leases pending review window 2200. In an embodiment, executed leases pending review window 2200 may be an expanded view of options related to executed leases pending review element 2108, and may be provided above, or in place of, dashboard view 2104. As shown in FIG. 22, executed leases pending review window 2200 includes a selectable list of leases 2202 and a review button 2204. A user may select or highlight a lease in list of leases 2202 and then select review button 2204 to review the selected lease, as shown in FIG. 23.

Figure 23:
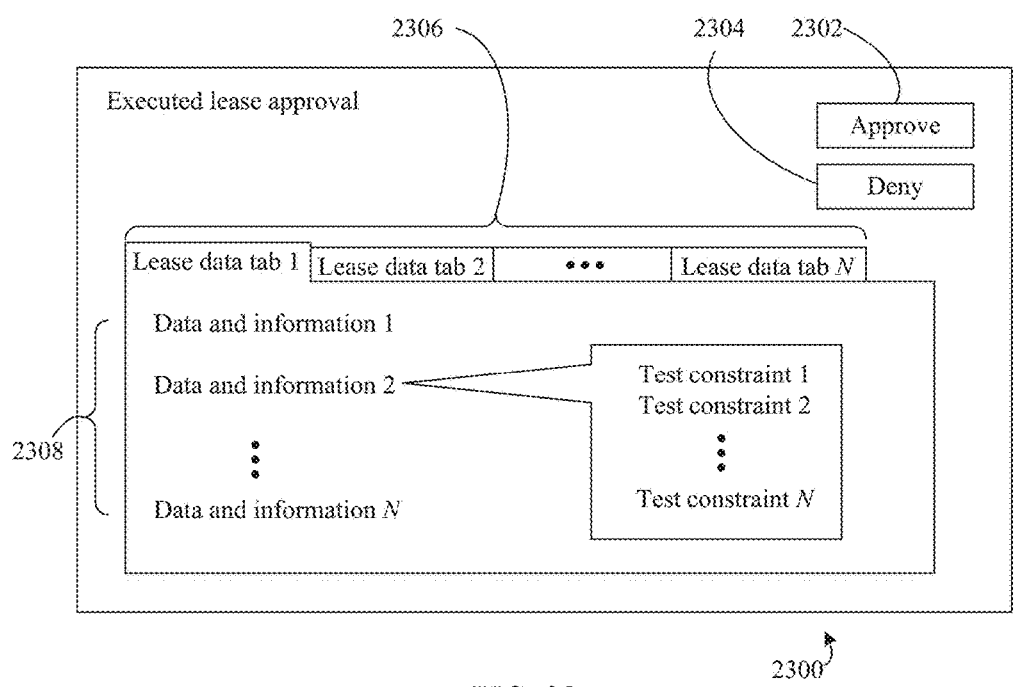

FIG. 23 shows a portion of an example executed leases approval window 2300. In an embodiment, executed leases approval window 2300 is configured to allow the user to approve or deny a pending executed lease based on a review of lease data and information. As shown, executed leases approval window 2300 includes an approve button 2302, a deny button 2304, and one or more lease data tabs 2306. The user may select a tab from lease data tabs 2306 to review data and information 2308 listed therein. In embodiments, data and information 2308 may include test constraints related to the lease under review and/or related to the user's accounting practices/preferences, and in some embodiments, data and information 2308 may be edited by the user. The user may select approve button 2302 to approve the lease under review, or the user may select deny button 2304 to deny or reject the lease under review. If the lease is approved, the user may view the approved lease in a list of approved leases by selecting approved leases to be managed element 2110 of FIG. 21. If the lease approval is denied, the user may again view the lease as described above with respect to FIGS. 21 and 22.

Figure 24:
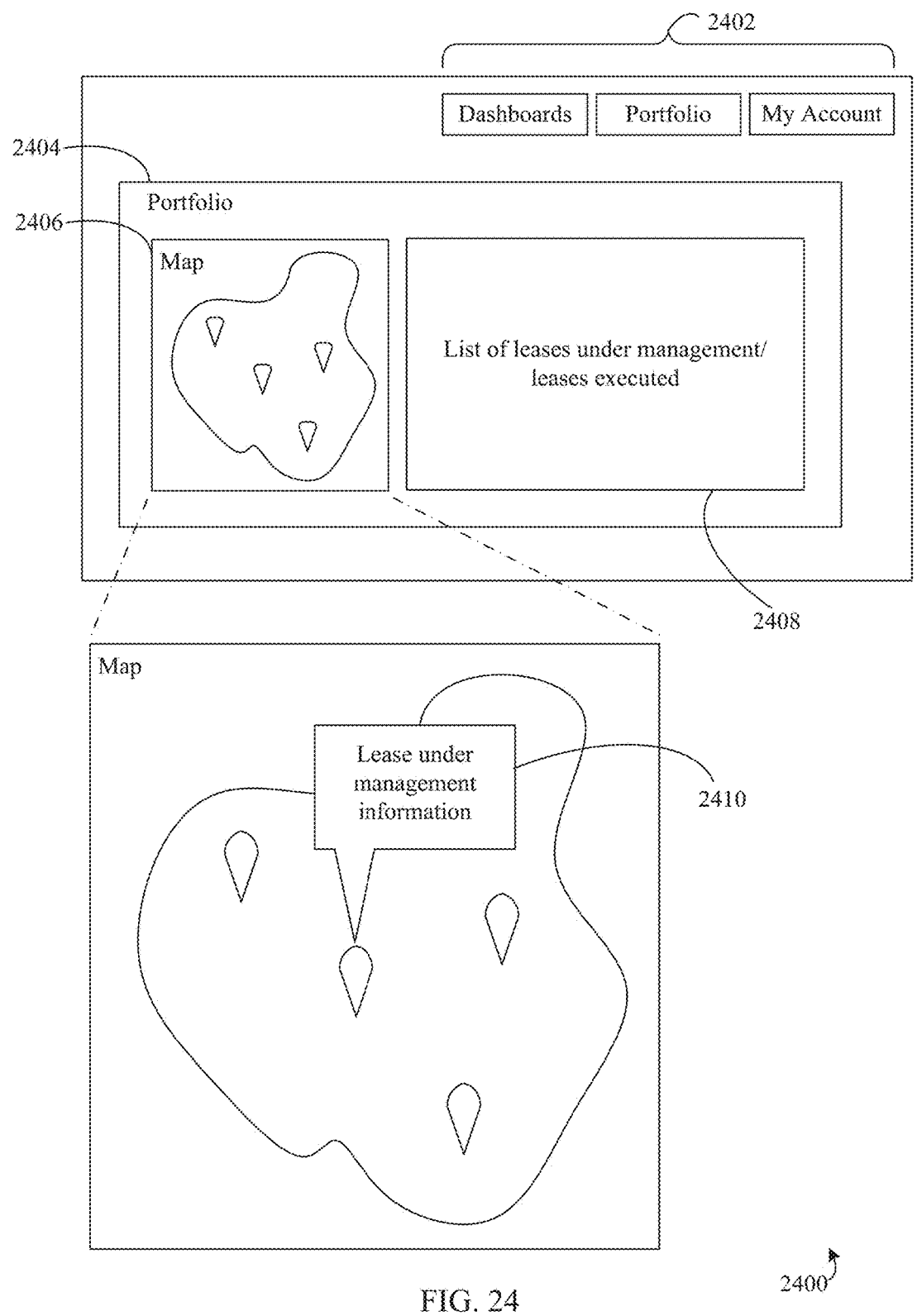

FIG. 24 shows a portion of an example corporate tenant dashboard interface 2400. In an embodiment, corporate tenant dashboard interface 2400 may be accessed by selecting approved leases to be managed element 2110 of FIG. 21. Corporate tenant dashboard interface 2400 includes one or more selectable view buttons 2402 configured to alternate between different modes and dashboard views of the corporate tenant user, and is configured to display a portfolio view 2404. Portfolio view 2404 includes a map 2406 and a list of leases under management 2408. In embodiments, map 2406 may be selected by the user to provide and expanded view in which information and location of leases under management 2410 may be viewed on map 2406 by the user.

Figure 25:
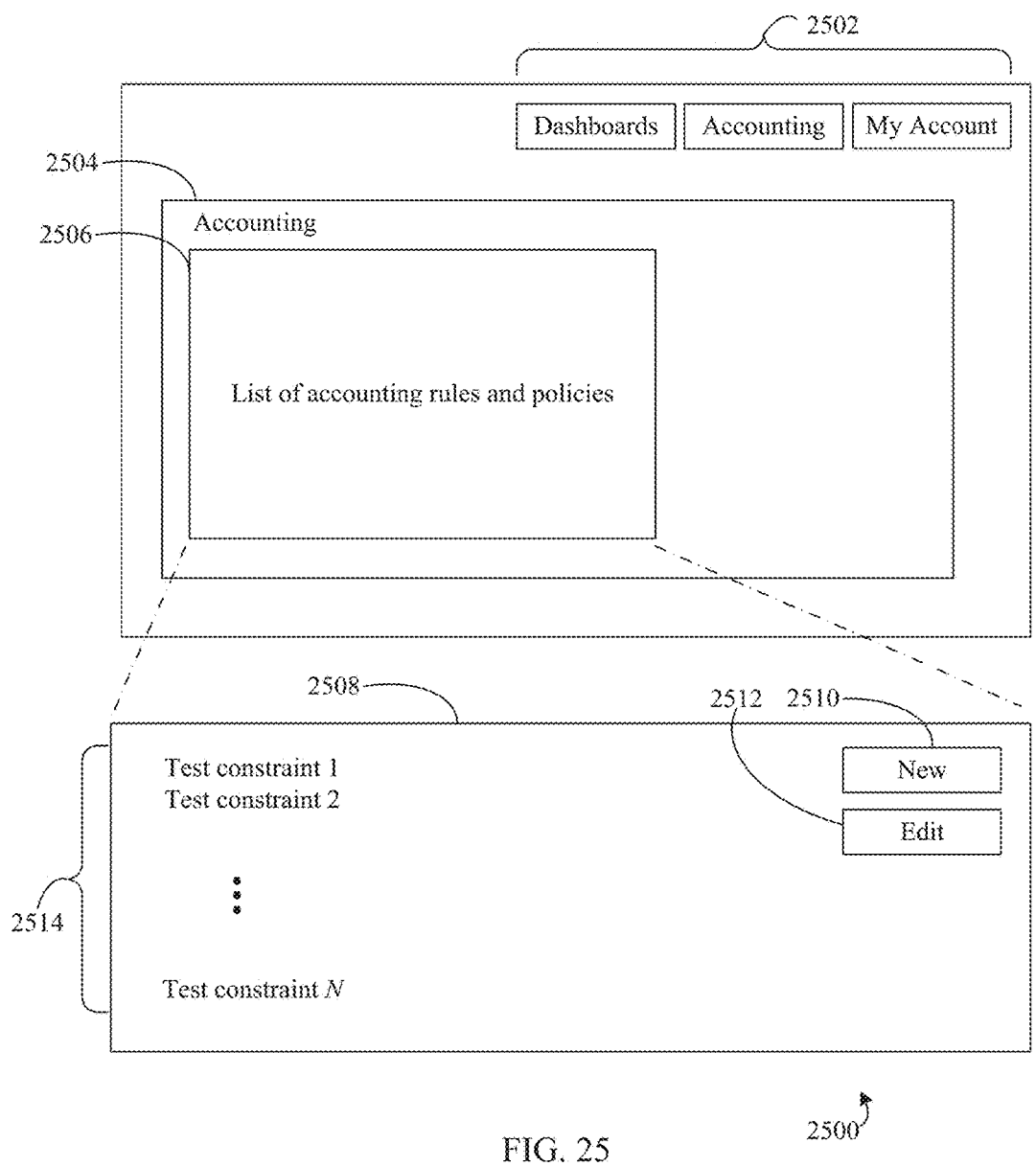

FIG. 25 shows a portion of an example corporate tenant dashboard interface 2500. In an embodiment, corporate tenant dashboard interface 2500 may be a dashboard tailored to lease accounting. Corporate tenant dashboard interface 2500 includes one or more selectable view buttons 2502 configured to alternate between different modes and dashboard views of the corporate tenant user, and is configured to display an accounting view 2504. Accounting view 2504 includes a list of lease accounting rules and policies 2506 of the user. List of lease accounting rules and policies 2506 may be selected and expanded, as an overlay or as a new view in accounting view 2504, to show constraint window 2508. Constraint window 2508 includes a new button 2510, an edit button 2512, and a test constraint list 2514. A user may add new constraints to test constraint list 2514 by selecting new button 2508 and entering a new accounting test constraint into test constraint list 2514. Similarly, an existing accounting test constraint may be edited (e.g., modified or deleted) in test constraint list 2514 by the user by selecting edit button 2512 and modifying the existing constraint. The accounting test constraints in test constraint list 2514 may be used as lease accounting input data elements as described in the embodiments herein.

Figure 26:
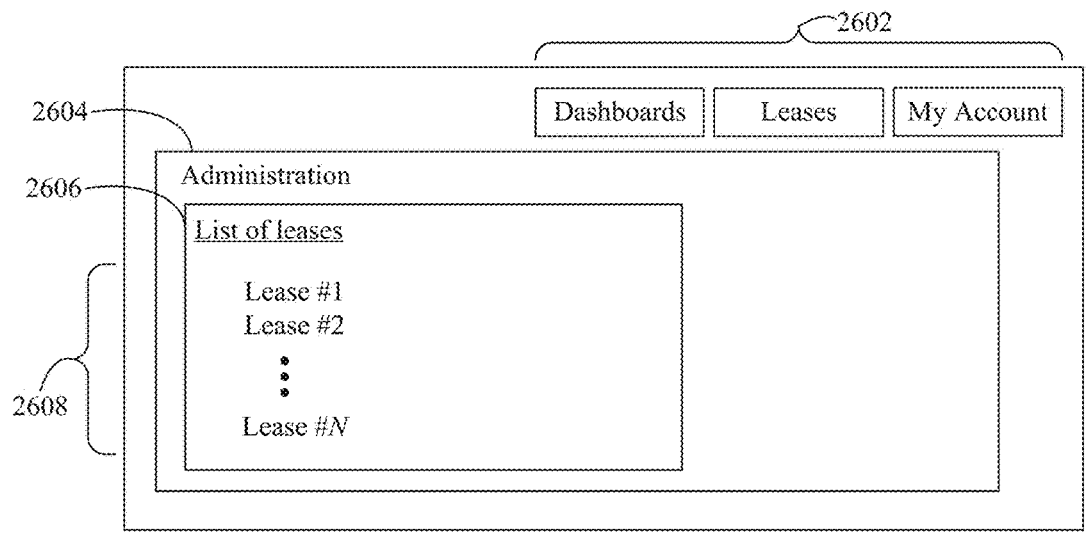

FIG. 26 shows a portion of an example corporate tenant dashboard interface 2600. In an embodiment, corporate tenant dashboard interface 2600 may be a dashboard tailored to lease administration. Corporate tenant dashboard interface 2600 includes one or more selectable view buttons 2602 configured to alternate between different modes and dashboard views of the corporate tenant user, and is configured to display an administration view 2604. Administration view 2604 includes a list of leases 2606 of the user to be managed. Each lease in list of leases 2606 may be selected and expanded, as an overlay or as a new view, in administration view 2604, to show information related to the selected lease.

Figure 27:
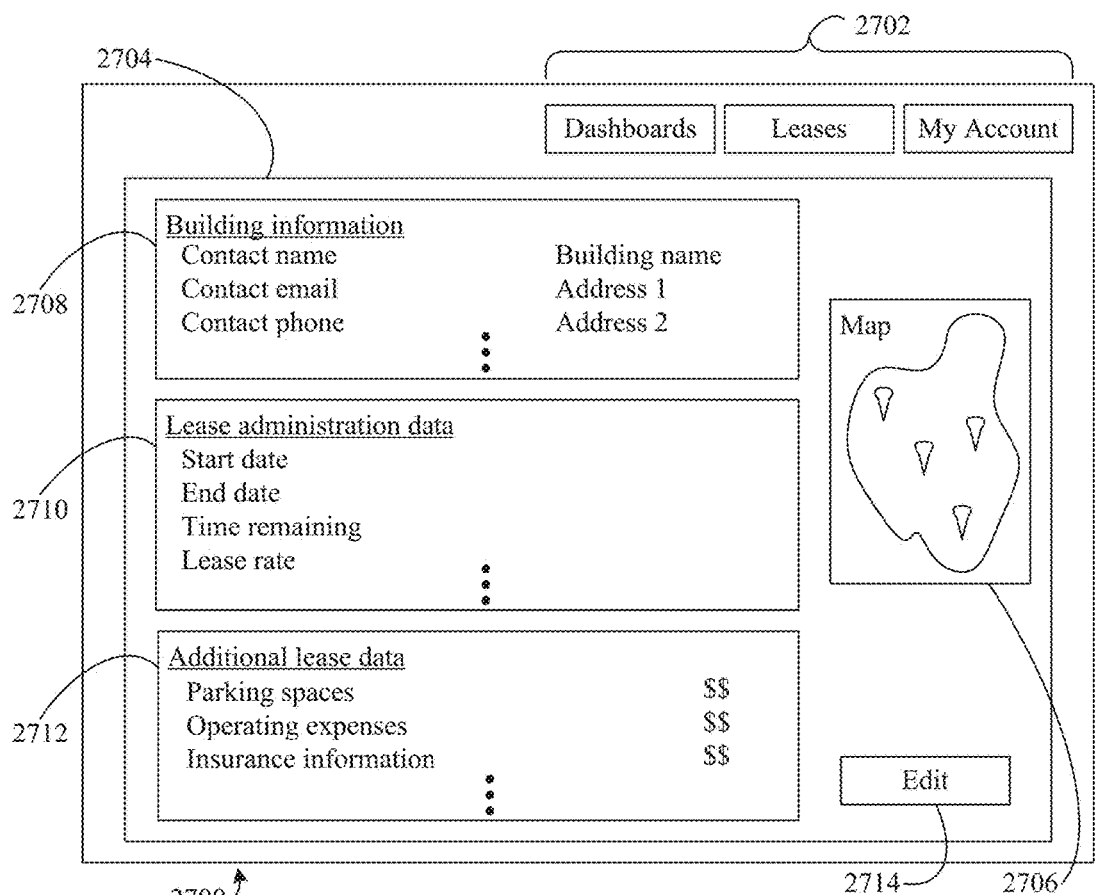

For instance, FIG. 27 shows a portion of an example corporate tenant dashboard interface 2700. In an embodiment, corporate tenant dashboard interface 2700 may be a dashboard tailored to lease administration. Corporate tenant dashboard interface 2700 includes one or more selectable view buttons 2702 configured to alternate between different modes and dashboard views of the corporate tenant user, and is configured to display an administration view 2704. In embodiments, administration view 2704 may be provided to the user upon selection of a lease from list of leases 2606 of FIG. 26. Administration view 2704 includes a map 2706, a building information list 2708, a lease administration data list 2710, an additional lease data list 2712, and an edit button 2714. In embodiments, map 2706 shows the location of the lease property (and, in some embodiments, other lease properties). Building information list 2708 includes information related to the property(ies) associated with the lease, lease administration data list 2710 includes lease administration data related to the lease, an additional lease data list 2712 includes additional lease-related information. Building information list 2708, lease administration data list 2710, and additional lease data list 2712 may be edited by the user by selecting one of the lists and then selecting edit button 2714. The information included building information list 2708, lease administration data list 2710, and additional lease data list 2712 may be used as lease administration input data elements as described in the embodiments herein.

Figure 28:
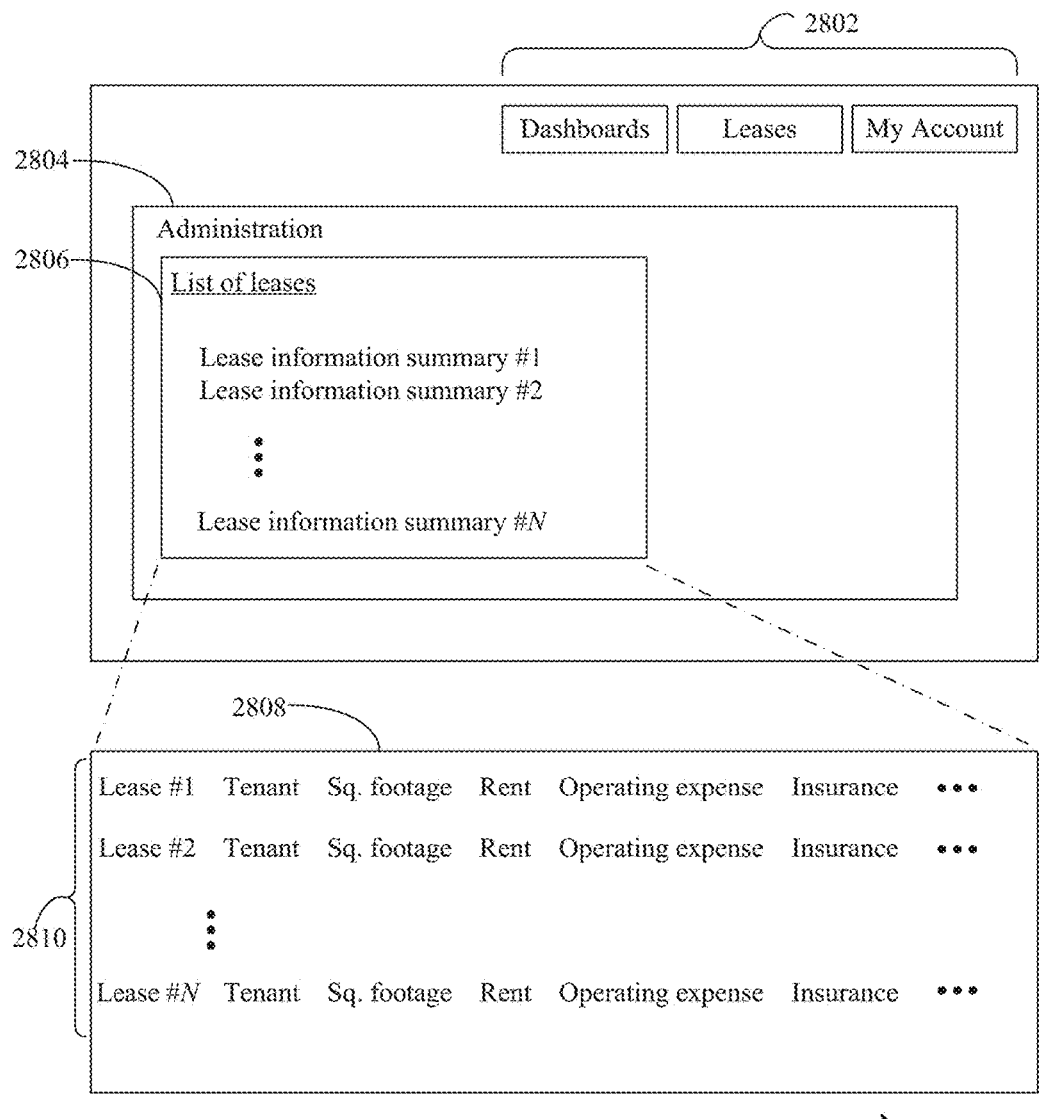

FIG. 28 shows a portion of an example corporate tenant dashboard interface 2800. In an embodiment, corporate tenant dashboard interface 2800 may be a dashboard tailored to lease administration. Corporate tenant dashboard interface 2800 includes one or more selectable view buttons 2802 configured to alternate between different modes and dashboard views of the corporate tenant user, and is configured to display an administration view 2804. Administration view 2804 includes a list of leases 2806 of the user to be managed that includes a summary of lease information for each lease. List of leases 2806 may be selected and expanded, as an overlay or as anew view, in administration view 2808, to show summary information 2810 related to the selected leases. Summary information 2810 may be used as lease administration input data elements as described in the embodiments herein.

Figure 29:
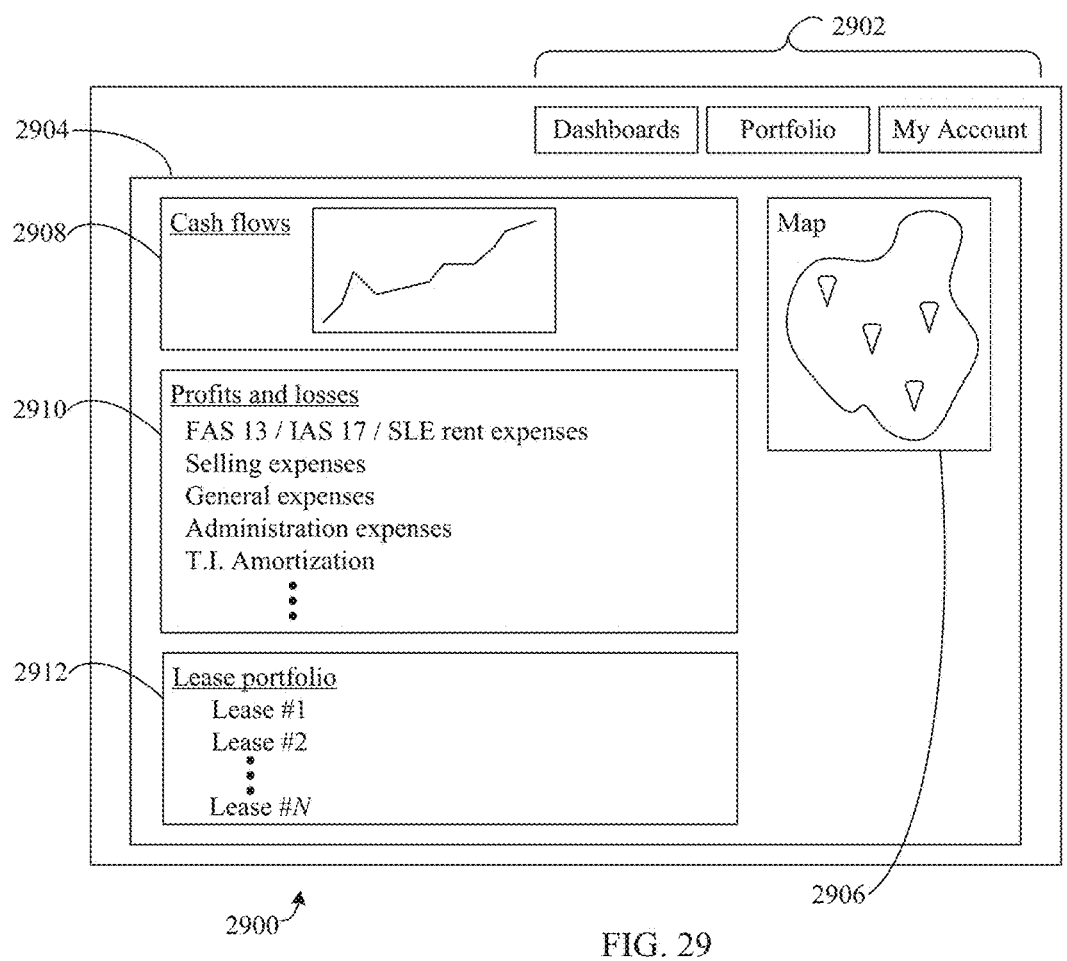

FIG. 29 shows a portion of an example corporate tenant dashboard interface 2900. Corporate tenant dashboard interface 2900 includes one or more selectable view buttons 2902 configured to alternate between different modes and dashboard views of the corporate tenant user, and is configured to display a dashboard view 2904. Dashboard view 2904 includes a map 2906, a first report view 2908, a second report view 2910, and portfolio view 2912. In embodiments, map 2906 shows the location of lease properties of the user. First report view 2908 may include reports related to lease analyses (such as cash flow), second report view 2910 may include reports related to lease accounting (such as profits and losses), and lease portfolio view 2912 may include a lease of leases associated with the user. Information and data provided in first report view 2908, second report view 2910, and/or portfolio view 2912 may include lease calculation inputs and/or outputs, as described herein.

Example Computer and Device Embodiments

Figure 30:
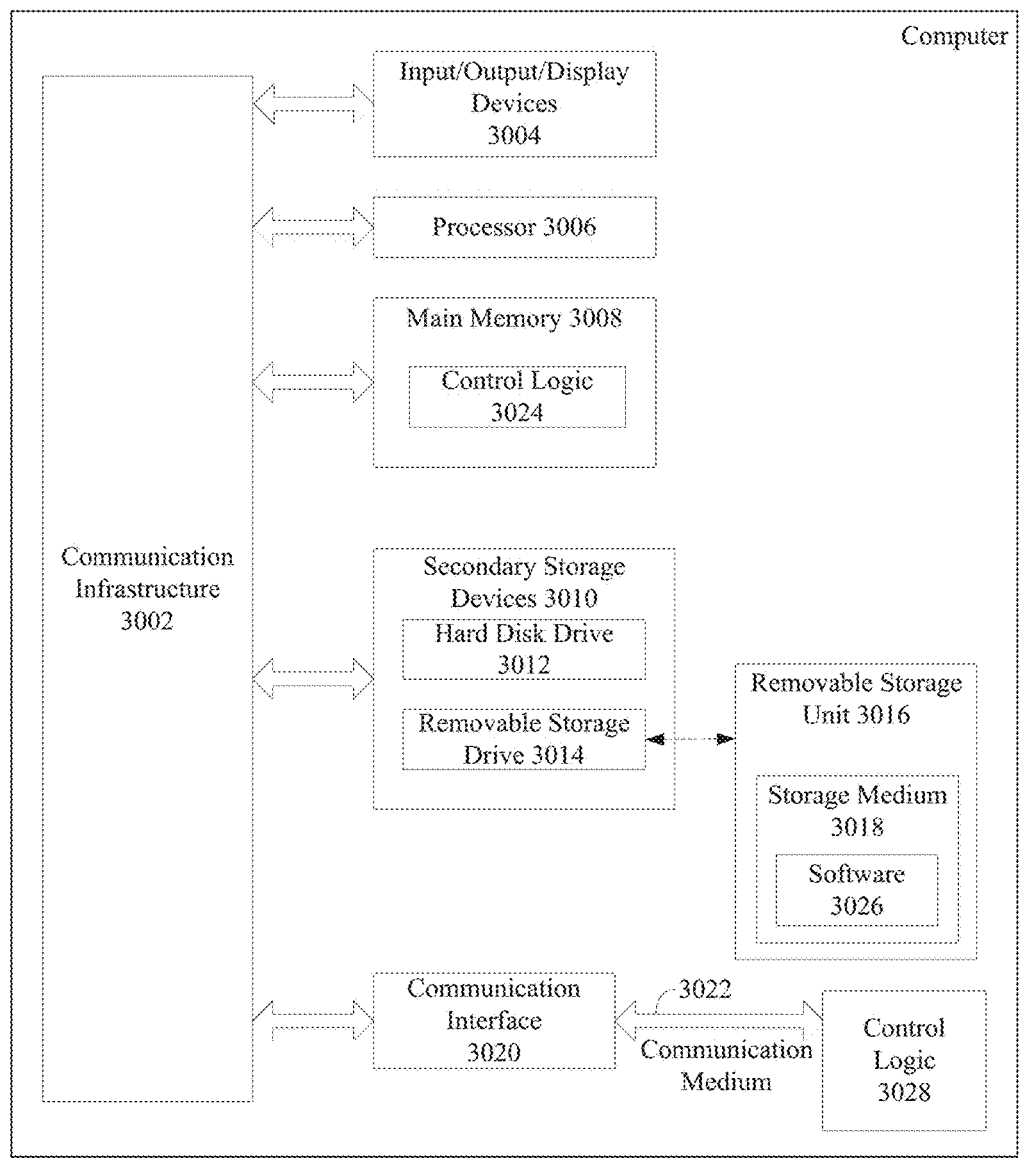
FIG. 30 is a block diagram of a computer system, according to an exemplary embodiment.

The various multi-media and computing devices, components, platforms, and/or modules described herein may be implemented in hardware, by software executed by a processing unit, or by a combination thereof. Where elements or steps described herein are implemented by software executed by a processing unit, such elements or steps may be implemented by one or more processor-based computer systems. An example of such a computer system is depicted in FIG. 30. That is, FIG. 30 shows an example system that may be used to implement computers, multi-media devices, components, platforms, and/or modules in some embodiments.

For instance, host/server 102, application database 104, client(s) 206, 208, and/or 210, secondary information source(s) 204, and/or any further systems, sub-systems, and/or components disclosed herein may be implemented in hardware (e.g., hardware logic/electrical circuitry), or any combination of hardware with software (computer program code configured to be executed in one or more processors or processing devices) and/or firmware.

The embodiments described herein, including systems, methods/processes, and/or apparatuses, may be implemented using well known processing devices, telephones (smart phones and/or mobile phones), servers, and/or computers, such as a computer shown in FIG. 30. It should be noted that the computer shown in FIG. 30 may represent communication devices, processing devices, databases, servers, and/or traditional computers in one or more embodiments.

Computer 3000 can be any commercially available and well known communication device, processing device, and/or computer capable of performing the functions described herein, such as devices/computers available from International Business Machines®, Apple®, HP®, Dell®, Cray®, Samsung®, Nokia®, etc. Computer 3000 may be any type of computer, including a desktop computer, a server, etc. Computer 3000 includes one or more processors (also called central processing units, or CPUs), such as a processor 3006. Processor 3006 is connected to a communication infrastructure 3002, such as a communication bus. In some embodiments, processor 3006 can simultaneously operate multiple computing threads. Computer 3000 also includes a primary or main memory 3008, such as random access memory (RAM). Main memory 3008 has stored therein control logic 3024 (computer software), and data. Computer 3000 also includes one or more secondary storage devices 3010. Secondary storage devices 3010 include, for example, a hard disk drive 3012 and/or a removable storage device or drive 3014, as well as other types of storage devices, such as memory cards and memory sticks. For instance, computer 3000 may include an industry standard interface, such a universal serial bus (USB) interface for interfacing with devices such as a memory stick. Removable storage drive 3014 represents a floppy disk drive, a magnetic tape drive, a compact disk drive, an optical storage device, tape backup, etc.

Removable storage drive 3014 interacts with a removable storage unit 3016. Removable storage unit 3016 includes a computer useable or readable storage medium 3018 having stored therein computer software 3026 (control logic) and/or data. Removable storage unit 3016 represents a floppy disk, magnetic tape, compact disk, DVD, optical storage disk, or any other computer data storage device. Removable storage drive 3014 reads from and/or writes to removable storage unit 3016 in a well-known manner. Computer 3000 also includes input/output/display devices 3004, such as touchscreens, LED and LCD displays, monitors, keyboards, pointing devices, etc. Computer 3000 further includes a communication or network interface 3018. Communication interface 3020 enables computer 3000 to communicate with remote devices. For example, communication interface 3020 allows computer 3000 to communicate over communication networks or mediums 3022 (representing a form of a computer useable or readable medium), such as LANs, WANs, the Internet, etc. Network interface 3020 may interface with remote sites or networks via wired or wireless connections. Control logic 3028 may be transmitted to and from computer 3000 via the communication medium 3022.

Any apparatus or manufacture comprising a computer useable or readable medium having control logic (software) stored therein is referred to herein as a computer program product or program storage device. This includes, but is not limited to, the computer, main memory, secondary storage devices, and removable storage unit. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic to implement, for example, in whole or in part, host/server 102, application database 104, client 206, 208, and 210, secondary information source(s) 204, application front end 106, application back end 108, display component 110, user information entry component 112, user database interface component 114, lease analysis component 116, rule component 118, comp component 120, accounting component 122, administration component 124, flowcharts 300, 400, and 500 respectively shown in FIGS. 3-5, and/or further embodiments described herein. Embodiments directed to computer program products comprising such logic (e.g., in the form of program code, instructions, or software) stored on any computer useable medium. Such program code, when executed in one or more processors, causes a device to operate as described herein.

Note that such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

Further Example Embodiments and Advantages

The embodiments described herein enable the use of data collected via lease calculations to provide various analyses and functions. Such embodiments may allow a user to generate reports and perform additional analyses based on previously entered information of the user and/or other users (e.g., repurposing data). The embodiments herein also allow for the reduction and/or elimination of duplicate work in performing independent tasks related to lease calculations, and allow for facilitation of user compliance with lease accounting rules. Embodiments also support centralized data management and access for performing lease calculation functions. Embodiments also support and/or create lease market data comparables, including reporting data related thereto.

It will be recognized that the systems, their respective components, and/or the techniques described herein may be implemented in hardware, software, firmware, or any combination thereof, and/or may be implemented as hardware logic/electrical circuitry.

The disclosed technologies can be put into practice using software, firmware, and/or hardware implementations other than those described herein. Any software, firmware, and hardware implementations suitable for performing the functions described herein can be used.

In an example aspect, a system is described. In an embodiment, the system includes a lease analysis component configured to receive at least one lease analysis input data element, generate at least one lease analysis output data element based on the at least one lease analysis input data element, and provide a lease analysis report including the at least one lease analysis output element to a user via a first user interface. In an embodiment, the system also includes a lease accounting component configured to receive the at least one lease analysis output element, receive one or more lease accounting input data elements, and repurpose the at least one lease analysis output element using at least one of the one or more lease accounting input data elements to generate at least one additional lease accounting input element. In the embodiment, the lease accounting component is also configured to generate at least one lease accounting output element automatically, based on the one or more lease accounting input elements and the at least one additional lease accounting input element, and provide a lease accounting report that includes the at least one lease accounting output element to at least the user via a second user interface.

In an embodiment of the system, the lease accounting component is configured to include in the lease accounting report an analysis of at least one lease under a first lease accounting standard and under a second lease accounting standard, where the analysis includes at least one of a cash flow analysis, a balance sheet, or a profits and losses accounting impact. In the embodiment, the lease accounting component is configured to include in the lease accounting report at least one journal entry related to at least one of the cash flow analysis, the balance sheet, or the profits and losses accounting impact.

In an embodiment of the system, the lease accounting component is configured to include in the lease accounting report a comparison between a first lease and a second lease based at least in part on the repurposed at least one lease analysis output element.

In an embodiment of the system, the lease accounting component is configured to include in the lease accounting report a financial reporting analysis of a lease that includes one or more of effects of one or more first lease accounting rules of the first lease accounting standard on the lease, effects of one or more second lease accounting rules of the second lease accounting standard on the lease, or at least one financial reporting requirement associated with the one or more first lease accounting rules or the one or more second lease accounting rules.

In an embodiment of the system, the lease accounting component is further configured to link and/or upload at least one of the lease accounting report or the at least one lease accounting output element to an accounting system of the user.

In an embodiment of the system, the lease analysis component and/or the accounting component is further configured to receive a representation of an amendment to a lease, and provide an additional lease analysis report and/or an additional lease accounting report related to the amendment, including information associated with at least one change in the lease analysis and/or the lease accounting of the user, to the user via the second user interface.

In an embodiment, the system further includes a database, the database configured to store data related to a plurality of users in a plurality of respective sub-databases, and share data related to one user of the plurality of users with other users of the plurality of users. In the embodiment, one or more of the at least one lease analysis output element or the one or more lease accounting input data elements are received from the database.

In an embodiment of the system, the one or more lease accounting input data elements include a user input, and the lease accounting report includes information related to the renewal of a lease.

In an embodiment of the system, the one or more lease accounting input data elements include a user input related to a lease accounting standard, and the lease accounting report includes information related to a classification of a lease as at least one of an operating lease or a capital lease or a "Type A" lease or a "Type B" lease.

In an example aspect, another system is described. In an embodiment, the system includes a lease administration component configured to receive at least one of at least one lease analysis output element, at least one lease accounting output element, or at least one real estate property lease comparables output element. In the embodiment, the lease administration component is also configured to receive one or more lease administration input data elements, repurpose the at least one lease analysis output element, the at least one lease accounting output element, and/or the at least one real estate property lease comparables output element using at least one of the one or more lease administration input data elements to generate at least one additional lease administration input element, generate at least one lease administration output element automatically, based on the one or more lease administration input elements and the at least one additional lease administration input element, and provide a lease administration report that includes the at least one lease administration output element to a user via a user interface.

In an embodiment of the system, the at least one lease administration output element includes one or more of a lease expiration date, a lease commencement date, a lease option exercise date, renewal options, a lease abstract, a square footage value associated with a lease, historical, current and/or future rent, remaining minimum rent obligations of a lease, termination options, expansion options, insurance requirements, sublease rights, assignment rights, holdover, termination penalties, gain on termination, notice provisions, estoppel requirements, audit rights, purchase options, restoration requirements, refurbishment allowances, standard services, above-standard service charges, or default provisions.

In an embodiment of the system, at least one of the one or more lease administration input data elements is provided by the user via the user interface, and the at least one of the one or more lease administration input data elements includes at least one of a lease administration policy of the user, a lease administration procedure of the user, a lease administration preference of the user, or user-specified lease administration data.

In an embodiment, the system further includes a database. In the embodiment, the database configured to store data related to a plurality of users in a plurality of respective sub-databases, and share data related to one user of the plurality of users with other users of the plurality of users. In the embodiment, one or more of the at least one lease analysis output element, the one or more lease accounting input data elements, and the at least one real estate property lease comparables output element are received from the database.

In an example aspect, still another system is described. In an embodiment, the system includes a comparables database configured to store information related to one or more leases of real estate properties. In the embodiment, the system also includes a comparables component configured to receive one or more of at least one lease accounting output element, at least one lease administration output element, and at least one lease analysis output element. In the embodiment, the comparables component is also configured to receive information related to at least one of the one or more leases of real estate properties stored in the comparables database, repurpose the one or more of the at least one lease accounting output element, the at least one lease administration output element, and the at least one lease analysis output element to automatically generate at least one comparables input data element, generate a comparables analysis based on the at least one comparables input data element and the information, and provide a comparables report based on at least a portion of the comparables analysis to a user via a user interface.

In an embodiment of the system, the comparables component is further configured to receive one or more user inputs to generate a report filter, and filter the comparables analysis according to the report filter prior to providing the comparables report.

In an embodiment of the system, the comparables component is further configured to receive one or more user inputs to generate a report filter, and filter the at least one comparables input data element and the information according to the report filter prior to generating the comparables analysis. In the embodiment, the comparables analysis is generated based on the filtered at least one comparables input data element and the filtered information.

In an embodiment of the system, the comparables database is further configured to receive third-party real estate property lease information from one or more third parties, and store the third-party real estate property lease information as a portion of the information.

In an embodiment of the system, the information includes first information related to a first user and second information related to a second user, the at least one lease analysis output element, the at least one lease accounting output element, or the at least one lease administration output element includes lease analysis data, lease accounting data, or lease administration data related to the first user and lease analysis data, lease accounting data, or lease administration data related to the second user, and the comparables report is provided to the first user via the user interface.

In an embodiment of the system, the comparables component is further configured to provide, in the comparables report, at least one of a comparison between a real estate property lease associated with the first user and at least one real estate property lease associated with each of one or more other users not affiliated with the first user, or a benchmark data report that includes an aggregated comparison between a plurality of leases for real estate properties associated with the first user and a plurality of leases for real estate properties associated with the one or more other users not affiliated with the first user.

CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system that comprises:
   at least one processor configured to execute program instructions;
   a memory configured to store the program instructions, the program instructions comprising:
   a lease administration component configured to:
      receive at least one of:
         at least one lease analysis output element;
         at least one lease accounting output element; or
         at least one real estate property lease comparables output element;
         wherein the at least one lease analysis output element, the at least one lease accounting output element, or the at least one real estate property lease comparables output element includes lease analysis data, lease accounting data, or lease comparables data related to a first user and lease analysis data, lease accounting data, or lease comparables data related to a second user not affiliated with the first user;
      receive one or more lease administration input data elements, wherein the one or more lease administration input data elements includes first data elements related to the first user and second data elements related to the second user;
      repurpose the at least one lease analysis output element, the at least one lease accounting output element, and/or the at least one real estate property lease comparables output element using at least one of the one or more lease administration input data elements to generate at least one additional lease administration input element;
      generate at least one lease administration output element automatically, based on the one or more lease administration input elements and the at least one additional lease administration input element; and
      provide a lease administration report that includes the at least one lease administration output element to the first user via a user interface and to a database from which the second user is enabled to obtain the lease administration report.

2. The system of claim 1, wherein the at least one lease administration output element includes one or more of:
   a lease expiration date, a lease commencement date, a lease option exercise date, renewal options, a lease abstract, a square footage value associated with a lease, historical, current and/or future rent, remaining minimum rent obligations of a lease, termination options, expansion options, insurance requirements, sublease rights, assignment rights, holdover, termination penalties, gain on termination, notice provisions, estoppel requirements, audit rights, purchase options, restoration requirements, refurbishment allowances, standard services, above-standard service charges, or default provisions.

3. The system of claim 1, wherein at least one of the one or more lease administration input data elements is provided by the first user via the user interface; and
   wherein the at least one of the one or more lease administration input data elements includes at least one of:
      a lease administration policy of the first user,
      a lease administration procedure of the first user,
      a lease administration preference of the first user, or
      first user-specified lease administration data.

4. The system of claim 1, further comprising:
   the database, the database configured to:
      store data related to a plurality of users in a plurality of respective sub-databases; and
      share data related to one user of the plurality of users with other users of the plurality of users;
   wherein one or more of the at least one lease analysis output element, the one or more lease accounting input data elements, or the at least one real estate property lease comparables output element are received from the database.

5. The system of claim 1, wherein one or more of the at least one lease analysis output element, the at least one lease accounting output element, the at least one real estate property lease comparables output element, or the one or more lease administration input data elements are related to a set of leases associated with the first user.

6. A computer-implemented method for a lease administration system, the computer-implemented method comprising:
   receiving at least one of:
      at least one lease analysis output element;
      at least one lease accounting output element; or
      at least one real estate property lease comparables output element;
      wherein the at least one lease analysis output element, the at least one lease accounting output element, or the at least one real estate property lease comparables output element includes lease analysis data, lease accounting data, or lease comparables data related to a first user and lease analysis data, lease accounting data, or lease comparables data related to a second user not affiliated with the first user;
   receiving one or more lease administration input data elements, the one or more lease administration input data elements includes first data elements related to the first user and second data elements related to the second user;
   repurposing the at least one lease analysis output element, the at least one lease accounting output element, and/or the at least one real estate property lease comparables output element using at least one of the one or more lease administration input data elements to generate at least one additional lease administration input element;

generating at least one lease administration output element automatically, based on the one or more lease administration input elements and the at least one additional lease administration input element; and providing a lease administration report that includes the at least one lease administration output element to the first user via a user interface and to a database from which the second user is enabled to obtain the lease administration report.

7. The computer-implemented method for the lease administration system of claim 6, wherein the at least one lease administration output element includes one or more of:

a lease expiration date, a lease commencement date, a lease option exercise date, renewal options, a lease abstract, a square footage value associated with a lease, historical, current and/or future rent, remaining minimum rent obligations of a lease, termination options, expansion options, insurance requirements, sublease rights, assignment rights, holdover, termination penalties, gain on termination, notice provisions, estoppel requirements, audit rights, purchase options, restoration requirements, refurbishment allowances, standard services, above-standard service charges, or default provisions.

8. The computer-implemented method for the lease administration system of claim 6, wherein at least one of the one or more lease administration input data elements is provided by the first user via a user interface; and wherein the at least one of the one or more lease administration input data elements includes at least one of:
a lease administration policy of the first user,
a lease administration procedure of the first user,
a lease administration preference of the first user, or
first user-specified lease administration data.

9. The computer-implemented method for the lease administration system of claim 6, further comprising:

storing in the database data related to a plurality of users in a plurality of respective sub-databases; and sharing, from the database, data related to one user of the plurality of users with other users of the plurality of users;

wherein one or more of the at least one lease analysis output element, the one or more lease accounting input data elements, or the at least one real estate property lease comparables output element are received from the database.

10. The computer-implemented method for the lease administration system of claim 6, wherein one or more of the at least one lease analysis output element, the at least one lease accounting output element, the at least one real estate property lease comparables output element, or the one or more lease administration input data elements are related to a set of leases associated with the first user.

11. A non-transitory computer readable storage medium having program instructions stored thereon that, when executed by one or more processors, perform a method in a lease administration system, the method comprising:

receiving at least one of:
at least one lease analysis output element;
at least one lease accounting output element; or
at least one real estate property lease comparables output element;
wherein the at least one lease analysis output element, the at least one lease accounting output element, or the at least one real estate property lease comparables output element includes lease analysis data, lease accounting data, or lease comparables data related to a first user and lease analysis data, lease accounting data, or lease comparables data related to a second user not affiliated with the first user;

receiving one or more lease administration input data elements, the one or more lease administration input data elements includes first data elements related to the first user and second data elements related to the second user;

repurposing the at least one lease analysis output element, the at least one lease accounting output element, and/or the at least one real estate property lease comparables output element using at least one of the one or more lease administration input data elements to generate at least one additional lease administration input element;

generating at least one lease administration output element automatically, based on the one or more lease administration input elements and the at least one additional lease administration input element; and providing a lease administration report that includes the at least one lease administration output element to the first user via a user interface and to a database from which the second user is enabled to obtain the lease administration report.

12. The non-transitory computer readable storage medium of claim 11, wherein the at least one lease administration output element includes one or more of:

a lease expiration date, a lease commencement date, a lease option exercise date, renewal options, a lease abstract, a square footage value associated with a lease, historical, current and/or future rent, remaining minimum rent obligations of a lease, termination options, expansion options, insurance requirements, sublease rights, assignment rights, holdover, termination penalties, gain on termination, notice provisions, estoppel requirements, audit rights, purchase options, restoration requirements, refurbishment allowances, standard services, above-standard service charges, or default provisions.

13. The non-transitory computer readable storage medium of claim 11, wherein at least one of the one or more lease administration input data elements is provided by the first user via the user interface; and wherein the at least one of the one or more lease administration input data elements includes at least one of:
a lease administration policy of the first user,
a lease administration procedure of the first user,
a lease administration preference of the first user, or
first user-specified lease administration data.

14. The non-transitory computer readable storage medium of claim 11, the method further comprising:

storing in the database data related to a plurality of users in a plurality of respective sub-databases; and sharing, from the database, data related to one user of the plurality of users with other users of the plurality of users;

wherein one or more of the at least one lease analysis output element, the one or more lease accounting input data elements, or the at least one real estate property lease comparables output element are received from the database.

* * * * *